US012134520B2

(12) United States Patent
Schauer et al.

(10) Patent No.: US 12,134,520 B2
(45) Date of Patent: Nov. 5, 2024

(54) RACK STORAGE SYSTEM COMPRISING AN IMPROVED LOAD MANIPULATION UNIT

(71) Applicant: TGW Mechanics GmbH, Wels (AT)

(72) Inventors: Johannes Schauer, St. Marienkirchen an der Polsenz (AT); Martin Rausch, Gmunden (AT)

(73) Assignee: TGW Mechanics GmbH, Wels (AT)

( * ) Notice: Subject to any disclaimer, the term of this patent is extended or adjusted under 35 U.S.C. 154(b) by 340 days.

(21) Appl. No.: 17/299,658

(22) PCT Filed: Dec. 6, 2019

(86) PCT No.: PCT/AT2019/060416
§ 371 (c)(1),
(2) Date: Jun. 29, 2021

(87) PCT Pub. No.: WO2020/113254
PCT Pub. Date: Jun. 11, 2020

(65) Prior Publication Data
US 2022/0041374 A1    Feb. 10, 2022

(30) Foreign Application Priority Data

Dec. 7, 2018   (AT) .............. A 51090/2018

(51) Int. Cl.
*B65G 1/04*   (2006.01)
*B65G 1/06*   (2006.01)
(Continued)

(52) U.S. Cl.
CPC ......... *B65G 1/1378* (2013.01); *B65G 1/0485* (2013.01); *B65G 1/0492* (2013.01); *B65G 1/06* (2013.01); *B66F 9/02* (2013.01)

(58) Field of Classification Search
CPC ....... B65G 1/0485; B65G 1/0492; B65G 1/06
See application file for complete search history.

(56) References Cited

U.S. PATENT DOCUMENTS 5,564,879 A   10/1996 Noguchi
6,406,246 B1   6/2002 Itoh et al.
(Continued)

FOREIGN PATENT DOCUMENTS

AT    509294 A1   7/2011
AT    511140 A1   9/2012
(Continued)

OTHER PUBLICATIONS

International Search Report in PCT/AT2019/060416, mailed Mar. 24, 2020.

*Primary Examiner* — Saul Rodriguez
*Assistant Examiner* — Willie W Berry, Jr.
(74) *Attorney, Agent, or Firm* — Collard & Roe, P.C.

(57) ABSTRACT

A rack storage system has two storage racks, a rack aisle therebetween, a loading good manipulation unit with a buffer device for buffering loading goods, and a loading good lifting device for storing and/or retrieving loading goods. The lifting device includes a vertical mast having a lifting guide, a lifting drive having a drive station and a traction device drive, and a lifting frame mounted on the guide and vertically movable using the lifting drive. The frame is connected to the traction device drive and includes a transport device. Furthermore, the system has an automated storage and retrieval unit displaceable in the aisle on guide tracks on the racks, and a conveying system adjoined to the manipulation unit. The frame is arranged on a mast side facing away from the aisle. The drive station with the drive motor located inside the aisle is arranged on a mast side facing the aisle.

37 Claims, 10 Drawing Sheets

(51) Int. Cl.
    *B65G 1/137* (2006.01)
    *B66F 9/02* (2006.01)

(56) References Cited

U.S. PATENT DOCUMENTS

| | | |
|---|---|---|
| 7,787,958 B2 | 8/2010 | Stevenson |
| 8,276,739 B2 | 10/2012 | Bastian, II et al. |
| 8,327,609 B2 | 12/2012 | Krizmanic et al. |
| 8,439,167 B2 | 5/2013 | Kocher et al. |
| 8,733,507 B2 | 5/2014 | Smith et al. |
| 8,876,454 B2 | 11/2014 | Koholka |
| 9,266,675 B2 | 2/2016 | Yamashita |
| 9,334,113 B2 | 5/2016 | Naylor |
| 9,725,238 B2 | 8/2017 | Mathys et al. |
| 9,771,214 B1 | 9/2017 | Green et al. |
| 9,771,217 B2 | 9/2017 | Lert et al. |
| 9,850,066 B2 | 12/2017 | Salichs et al. |
| 9,988,212 B2 | 6/2018 | Yamashita |
| 10,173,839 B2 | 1/2019 | Ahammer et al. |
| 10,611,568 B2 * | 4/2020 | Schack ............. B65G 1/0492 |
| 11,046,514 B2 | 6/2021 | Hart et al. |
| 11,198,560 B2 | 12/2021 | Schack et al. |
| 11,780,675 B2 | 10/2023 | Hart et al. |
| 2004/0159501 A1 | 8/2004 | Bloch et al. |
| 2008/0247848 A1 | 10/2008 | Freudelsperger |
| 2010/0158648 A1 | 6/2010 | Schaefer |
| 2012/0185080 A1 | 7/2012 | Cyrulik et al. |
| 2012/0207567 A1 * | 8/2012 | Koholka ............. B65G 1/0485 414/277 |
| 2012/0282068 A1 | 11/2012 | Tschurwald et al. |
| 2015/0239667 A1 | 8/2015 | Naylor |
| 2016/0009492 A1 | 1/2016 | Stevens |
| 2016/0264356 A1 | 9/2016 | Wakizaka |
| 2016/0355339 A1 | 12/2016 | Peng |
| 2018/0208397 A1 | 7/2018 | Schack et al. |
| 2020/0071074 A1 | 3/2020 | Hart et al. |
| 2020/0198891 A1 | 6/2020 | Schack et al. |

FOREIGN PATENT DOCUMENTS

| | | |
|---|---|---|
| AT | 521359 B1 | 1/2020 |
| CN | 2319384 Y | 5/1999 |
| CN | 2707897 Y | 7/2005 |
| CN | 101641270 A | 2/2010 |
| CN | 102725213 A | 10/2012 |
| CN | 104066661 A | 9/2014 |
| CN | 105392719 A | 3/2016 |
| CN | 106564806 A | 4/2017 |
| CN | 107032035 A | 8/2017 |
| CN | 206456846 U | 9/2017 |
| CN | 107986139 A | 5/2018 |
| CN | 108116826 A | 6/2018 |
| DE | 2 441 557 A1 | 3/1976 |
| DE | 20 2004 008678 U1 | 8/2004 |
| DE | 20 2006 003068 U1 | 7/2007 |
| DE | 10 2011 012 424 A1 | 8/2012 |
| DE | 10 2013 114 275 A1 | 6/2014 |
| EP | 0 658 508 A1 | 6/1995 |
| EP | 1 716 060 B1 | 7/2007 |
| EP | 2 132 113 B1 | 11/2011 |
| EP | 2 436 620 A2 | 4/2012 |
| EP | 2 158 144 B1 | 10/2012 |
| EP | 2 327 643 B1 | 4/2013 |
| EP | 2 949 604 A1 | 12/2015 |
| EP | 2 673 217 B1 | 10/2016 |
| EP | 3 354 598 A1 | 8/2018 |
| EP | 2 709 933 B1 | 4/2020 |
| EP | 3 188 987 B1 | 12/2020 |
| JP | S50-150963 U | 12/1975 |
| JP | H07-112805 A | 5/1995 |
| JP | 2007-238197 A | 9/2007 |
| JP | 2009-121583 A | 6/2009 |
| JP | 2010-052873 A | 3/2010 |
| JP | 2016-060622 A | 4/2016 |
| JP | 2016-155659 A | 9/2016 |
| JP | 2016/169083 A | 9/2016 |
| KR | 100886373 B1 | 3/2009 |
| WO | 2012/106744 A1 | 8/2012 |
| WO | 2012/155169 A1 | 11/2012 |
| WO | 2013/090970 A2 | 6/2013 |
| WO | 2015/181108 A1 | 12/2015 |
| WO | 2015/181109 A1 | 12/2015 |
| WO | 2016/033628 A1 | 3/2016 |

* cited by examiner

RACK STORAGE SYSTEM COMPRISING AN IMPROVED LOAD MANIPULATION UNIT

CROSS REFERENCE TO RELATED APPLICATIONS

This application is the National Stage of PCT/AT2019/060416 filed on Dec. 6, 2019, which claims priority under 35 U.S.C. § 119 of Austrian Application No. A 51090/2018 filed on Dec. 7, 2018, the disclosure of which is incorporated by reference. The international application under PCT article 21(2) was not published in English.

BACKGROUND OF THE INVENTION

1. Field of the Invention

The invention relates to a rack storage system comprising a first storage rack having storage locations for loading goods which are arranged next to one another on storage levels located on top of one another and a second storage rack having storage locations for loading goods which are arranged next to one another on storage levels located on top of one another. The first storage rack and the second storage rack face each other at a distance in a horizontal z direction, whereby a rack aisle is configured between the first storage rack and the second storage rack which has a horizontal longitudinal axis extending in a x direction which is aligned orthogonally to the z direction. The first storage rack has (first) front uprights, (first) rear uprights, (first) front longitudinal beams per storage level which extend in the x direction and are connected to the (first) front uprights, (first) rear longitudinal beams per storage level which extend in the x direction and are connected to the (first) rear uprights, and a (first) shelf having the storage locations per storage level which is arranged between the (first) front longitudinal beam and the (first) rear longitudinal beam. The first storage rack has (second) front uprights, (second) rear uprights, (second) front longitudinal beams per storage level which extend in the x direction and are connected to the (second) front uprights, (second) rear longitudinal beams per storage level which extend in the x direction and are connected to the (second) rear uprights, and a (second) shelf having the storage locations per storage level which is arranged between the (second) front longitudinal beam and the (second) rear longitudinal beam. Further, the rack storage system comprises a loading good manipulation unit which has a first buffer device offset laterally to the rack aisle in the z direction, and a first loading good lifting device for storing and/or retrieving loading goods. The first loading good lifting device is in particular arranged in the periphery of the rack aisle. The first buffer device has provisioning devices on at least some of the storage levels which are respectively configured for buffering a loading good or multiple loading goods and are arranged adjacent in the x direction on one of the sides of the first loading good lifting device or adjacent in the x direction at both sides of the first loading good lifting device. The first loading good lifting device comprises a first vertical mast having a first lifting guide, and a first lifting drive having a first drive station as well as a traction means drive. The vertical mast is in particular arranged in a periphery of the rack aisle, installed in a stationary manner and in particular affixed to the first storage rack. Furthermore, the first loading good lifting device comprises a first lifting frame mounted on the first lifting guide and vertically movable using the first lifting drive, which is connected to the traction means drive of the first lifting drive, and a first transport device arranged on the first lifting frame which is configured at least for transporting the loading goods between one of the provisioning devices and the first transport device in the x direction. The rack storage system further comprises guide tracks which are respectively arranged in pairs (in particular at the same height level) on the (first) front longitudinal beams of the first storage rack and on the (second) front longitudinal beams of the second storage rack in horizontal travel planes located on top of one another and extend in a x direction along the first storage rack, the second storage rack and the provisioning devices. In addition, the rack storage system comprises at least one automated storage and retrieval unit (in particular a single-level storage and retrieval unit) having at least one load handling device for transporting the loading goods between the storage locations and the provisioning devices which is displaceable in the x direction along the guide tracks on a travel plane in front of the storage locations and in front of the provisioning device. Finally, the rack storage system comprises a first conveying system for transporting loading goods to the first loading good lifting device and for transporting loading goods from the first loading good lifting device, which first conveying system is adjoined to the loading good manipulation unit, wherein the first loading good lifting device connects, in terms of conveying, the first conveying system and the provisioning devices.

2. Description of the Related Art

Different embodiments of an automated rack storage system are known, for example, from EP 2327643 B1, EP 2436620 A2, EP 2158144 B1, EP 1716060 B1, EP 2132113 B1 and DE 102011012424 A1.

However, the known rack storage systems have a number of disadvantages:

In a solution according to the prior art in which the drive motors are arranged below the lifting frame, the lifting frame cannot be lowered very far, whereby the connection to a conveying system must equally take place at a relatively large distance to the floor. Also known are solutions in which the drive motors are arranged adjacent in the x direction to the vertical mast. While this ensures that a bottom approach height (i.e. a bottommost vertical position of the lifting frame on the vertical mast) can be minimized, drive motors are very difficult to access and difficult to maintain from the rack aisle.

If an endless traction means (such as a flat belt or toothed belt) is used for the vertical movement of the lifting frame, the endless traction means is guided in a known manner around a drive wheel and a deflection wheel, if applicable also over guide wheels. To prevent the traction means from popping out of the drive wheel, deflection wheel or guide wheel and to prevent the traction means from slipping through over the drive wheel or to prevent the traction means from jumping over teeth of the drive wheel, a pretension is applied to the traction means. Under stress, the endless traction means has essentially two sections, namely a tight side and a slack side. In addition to the pretension, there is a stress tension proportion on the tight side which is impacted by the weight of the lifting frame. This stress tension proportion expands the tight side in comparison to the unstressed state. This expansion is absorbed by the slack side, which is then shortened in comparison to the unstressed state. Accordingly, the tension acting on the slack side is reduced to a level below the pretension in the unstressed state. To prevent the traction means from popping out of a deflection wheel (or—if provided—a guide wheel) in the region of the slack side, the pretension on the slack side should not go down to zero also in this stress state, as the traction means will otherwise go slack. Such a state must also be prevented in particular whenever the lifting frame is accelerated upward and the tight side is expanded even more due to the increased stress tension proportion.

The vertical position of the lifting frame in its bottommost position is particularly problematic, as the slack side is then shortest. The pretension in the traction means should be selected at a sufficient level to ensure that the length compensation can be done also in this state without the slack side going slack. This is difficult in particular in solutions according to the prior art in which the drive wheel for the traction means is located in the base region of the mast (directly below the top deflection wheel in the head region of the mast), because the slack side is generally particularly short in such a solution. In this case, it is especially disadvantageous that the usable stress tension proportion is reduced due to the high pretension required in the traction means. Accordingly, relatively large cross sections for the traction means are required in order for the stipulated loads to even be carried and moved.

As a rule, relatively massive profile cross sections are furthermore used for the vertical mast. The vertical mast is thus heavy and expensive. In particular, also the assembly for mast heights of 30 to 40 m takes effort and can only be done using heavy cranes.

The rack storage systems known from the prior art also do not offer any generally effective solutions for the case that the traction means drive should fail (for example because a traction means of the traction means drive ruptures). While a safety brake may be assigned to the lifting frame, this safety brake only brakes after a delay time or brake engagement time. If, during the failure of the traction means drive, the lifting frame is located below the height which corresponds to the delay time or brake engagement time of the safety brake, the safety brake is completely ineffective. In case the lifting frame is moving downward during the rupturing of the traction means, the problem becomes even more apparent. A rupturing of the traction means will therefore generally involve great damage.

On account of the overall height of the storage rack of several meters, known systems are also prone to oscillations which are discharged into the rack store as a result of the operation of the movable components (e.g. as a result of the operation of the storage and retrieval unit or also as a result of the operation of the lifting frame or lifting frames of the loading good lifting device(s)). In addition, such oscillations and/or vibrations are facilitated by the trend toward ever higher motion speeds and accelerations, in particular of the vertically displaceable lifting frame. It is problematic in this case that loading goods with a low weight can be "shaken out of" their intended position in which they are deposited in the storage rack. This may result in an automatic removal by a storage and retrieval unit being made more difficult or even being prevented, and troubleshooting being required. This means, among other things, a standstill, manual intervention and associated costs.

SUMMARY OF THE INVENTION

It is therefore an object of the invention to specify an improved rack storage system. In particular, the lifting frame is to be lowerable far, the traction means is to be prevented from popping out of its guide or slipping through, a damage during a failure of the traction means drive is to be kept small, the assembly of the vertical mast is to be simplified and/or vibrations in the rack storage system are to be kept minor.

The object of the invention is achieved by a rack storage system of the kind mentioned in the beginning in which the first lifting frame having the first transport device is arranged on a side of the vertical mast facing away from the rack aisle and the first drive station, which comprises a first drive motor, is arranged on a side of the vertical mast facing the rack aisle, and the first drive motor is arranged inside the rack aisle.

The proposed measures ensure that the drive motor is easily accessible from the rack aisle, whereby the mounting and the maintenance of the drive motor are possible in a simple manner. Furthermore, the lifting frame can travel particularly close to the floor as the drive motor is arranged outside of the motion travel of the lifting frame. A bottom approach height (i.e. a bottommost vertical position of the lifting frame on the vertical mast) is in particular less than 500 mm, in particular 375 mm.

The vertical mast may be arranged in the rack aisle. Yet the vertical mast may also advantageously be arranged offset laterally to the rack aisle in the z direction, i.e. outside of the rack aisle.

The first traction means drive of the first loading good lifting device comprises a traction means, in particular an endless traction means. In a favorable variant embodiment of the rack storage system, the traction means is guided around a drive wheel (which is coupled with the drive motor), a top/bottom deflection wheel, and around at least one guide wheel. The drive wheel, the top and bottom deflection wheel, the guide wheel, and, if applicable, a tensioning mechanism for the traction means are equally part of the traction means drive. The drive station comprises the drive wheel and the drive motor, which may be mounted on a common base plate. The drive wheel is both part of the drive station and part of the traction means drive. The bottom deflection wheel is mounted in the base region of the mast, the top deflection wheel in the head region of the mast. The traction means may in particular be configured as a toothed belt, and the drive wheel as a toothed disk.

The proposed measures ensure that the driving force and/or the driving power of the drive motor can be transmitted to the lifting frame when only small masses are moved. Also, the drive motor can be installed permanently close to the floor and does not add to the moving mass of the lifting frame. In particular if the vertical mast is configured with an open profile cross section or as a hollow profile, one of the sides of the traction means can also be guided on the inside of same.

The positioning of the drive wheel in the rack aisle ensures furthermore that the slack side is considerably extended compared to a solution in which the drive wheel for the traction means is arranged in the base region of the mast. The length of the slack side can be approximately doubled compared to these known solutions. The proposed measures ensure that the slack side can more easily absorb the expansion occurring on the tight side under stress and/or acceleration of the lifting frame. The pretension in the traction means can therefore be selected lower without a risk of the traction means popping of out of the bottom deflection wheel or a guide roller (if configured in the region of the slack side), or of the traction means slipping through over the drive wheel and/or of the traction means jumping over teeth of the drive wheel. Accordingly, the usable stress tension proportion is comparatively high, and only relatively small cross sections are required for the traction means to carry and move the stipulated loads. The provision of a guide roller additionally widens the wrap angle around the drive wheel, which additionally improves the lifting drive.

To achieve the above-mentioned objective, it is of advantage if
- the traction means drive comprises a drive wheel, a bottom deflection wheel, a top deflection wheel, a guide wheel and a traction means guided around the drive wheel, the bottom deflection wheel, the top deflection wheel and the guide wheel, wherein
- the bottom deflection wheel is arranged in the region of a base of the vertical mast (specifically in the region of the slack side of the traction means on the base of the vertical mast) and the top deflection wheel is arranged in the region of a head of the vertical mast,
- the guide wheel is arranged in the region of the base of the vertical mast between the bottom deflection wheel and the drive wheel,
- the drive wheel is arranged at a distance to the vertical mast in the region of the base of the vertical mast, and
- a center-to-center distance (in particular a horizontal center-to-center distance) between the drive wheel and the bottom deflection wheel is at least 300 mm. Particularly preferably, said center-to-center distance is between 350 mm and 800 mm.

Advantageously, the first loading good lifting device may have a tensioning mechanism for assembling the traction means and/or for setting a pretension force in the traction means which is arranged on the side of the vertical mast facing the rack aisle.

Due to the proposed measures, the tensioning mechanism is easily accessible from the rack aisle, whereby the tensioning of the traction means during the production of the rack storage system or a retensioning of the traction means during the maintenance of the rack storage system are possible in a simple manner. Turnbuckles, for example, for which the tension of the traction means can be set with the help of a screw and/or a nut can be used as a tensioning mechanism.

The object of the invention is also achieved by a rack storage system of the kind mentioned in the beginning in which the vertical mast has an open profile cross section, wherein the profile cross section comprises a profile base (also known as "profile web"), profile legs protruding from same (and in particular extending in parallel) and mounting legs angled off the free ends of the profile legs on which the vertical mast is affixed to the first storage rack.

The profile cross section can thus in particular be C-shaped (with mounting legs bent inward) or U-shaped with mounting legs directed outward, in particular bent outward. The open construction ensures that the fittings on the vertical mast are easily accessible, whereby not only the production of the loading good manipulation unit but also its maintenance is simplified. The mounting legs are directed outward or inward about a vertical axis of the mast (in particular bent about a vertical axis) and offer a supporting surface for the mounting of the vertical mast on the first storage rack. In particular, the vertical mast is connected to the storage rack via connection means. In particular screws may be provided as connection means, yet also a connection by rivets or clamps is conceivable. The affixing of the vertical mast to the storage rack, in particular in multiple mounting sections located vertically on top of one another, ensures that the vertical mast is exceptionally stable, in particular against distortion and even for mast heights of 30 to 40 m, despite the open construction. Furthermore, it is of advantage that the use of material is low and also the weight is reduced to a minimum. This enables a simpler assembly with a lower technical complexity, and also the transport costs are low. Yet it is generally also conceivable that the vertical mast has a closed profile cross section and is in particular configured as a rectangular tube. In this case, the vertical mast has a particularly high distortional stiffness.

Finally, the object of the invention is also achieved by a rack storage system of the kind mentioned in the beginning in which the loading good manipulation unit comprises an energy-absorbing deformation means. The deformation means is fixedly mounted below the first lifting frame, in particular on a side of the vertical mast facing away from the rack aisle (for example on a fixed component of the loading good manipulation unit or directly on a floor, the steel construction of the rack storage system or a mezzanine floor of the building in which the rack storage system is installed).

In this way, damage to the loading good manipulation unit is kept small if the traction means drive should fail (for example because a traction means of the traction means drive ruptures) and the lifting frame is not assigned a safety brake, or a safety brake for the lifting frame should not respond rapidly enough. A safety brake can for example have a delay time or brake engagement time of 0.2 to 0.6 sec, which, in accordance with the formula:

$$h = \frac{g \cdot t^2}{2}$$

corresponds to a drop height of 0.20 to 1.80 m. If, during the failure of the traction means drive, the lifting frame is located below the height which corresponds to the delay time or brake engagement time of the safety brake, the safety brake is completely ineffective. In case the lifting frame is moving downward at its maximum speed upon the rupturing of the traction means, the problem becomes even more apparent. For a travel speed of 6 m/s, the delay time specified above corresponds to an additional height of 1.20 m and/or 3.60 m. In this case, the safety brake is completely ineffective below a height of 1.40 m and/or below a height of 5.40 m. With the help of the deformation means, the impact of the lifting frame can nevertheless be dampened. Advantageously, a deformation means generally has a lower overall height than hydraulic dampers, for example. In normal operation, the lifting frame can therefore be moved further downward than it would be the case when using hydraulic dampers, for example.

It should be noted in this context that
- the configuration of the first lifting frame having the first transport device on a side of the vertical mast facing away from the rack aisle and the configuration of the first drive station, which comprises a first drive motor, on a side of the vertical mast facing the rack aisle, and the configuration of the first drive motor inside the rack aisle and/or
- the provision of an open profile cross section for the vertical mast, wherein the profile cross section comprises a profile base, profile legs protruding from same (and in particular extending in parallel) and mounting legs angled off the free ends of the profile legs on which the vertical mast is affixed to the first storage rack and/or
- the provision of an energy-absorbing deformation means which is fixedly mounted below the first lifting frame, in particular on a side of the vertical mast facing away from the rack aisle, can be applied in a rack storage system respectively individually or in any combination.

Generally, a "shelf" may in particular comprise crossbars and/or support bars extending in a z direction or be configured as a compartment shelf or as a grid shelf.

The transport of the loading goods between the storage locations and the provisioning devices is in particular understood to mean the takeover of loading goods from a provisioning device, the storing of loading goods in the storage locations, the retrieving of loading goods from the storage locations and the handover of loading goods onto one of the provisioning devices.

A connection, in terms of conveying, between the first conveying system and the provisioning devices by means of the first loading good lifting device enables in particular loading goods to be taken over from the first conveying system onto the first loading good lifting device and to be dispensed onto a provisioning device and/or loading goods to be taken over from a provisioning device onto the first loading good lifting device and to be dispensed onto the first conveying system.

The "provisioning devices" can, according to a first embodiment, be configured as passive provisioning devices and respectively comprise a stationary supporting table (without conveyor elements) for buffering one or multiple loading goods, and, according to a second embodiment, be configured as active provisioning devices and respectively comprise a conveying means (having at least one motor-driven conveyor element—e.g. having at least one conveyor roller).

Depending on the embodiment, the transport device can be configured or operated such that the loading goods are transported in only one direction on it or such that the loading goods can be transported in both directions on it (reversing operation). The transport device can be formed, for example, by a conveying means or a load handling device, such as this is described in WO 2013/090970 A2, for example.

A "storage location" is generally an area in the rack storage system in which a loading good can be stored. The loading goods can be stored in the storage locations directly or with the help of loading aids. The storage locations are arranged on various "storage levels."

A "loading aid" generally serves the storage and the transport of loading goods in the rack storage system and can in particular be configured as a container, cardboard box, tray, pallet, bag (in particular as a "polybag"), pouch, sack or hanging bag. It should be noted in this context that not all loading aids in the rack storage system must have the same properties, but the loading aids may also be configured differently. In addition, the loading aids can have multiple receiving zones/receiving compartments.

A "storage and retrieval unit" is a conveying vehicle operated in an automated manner which travels on rails and can be configured as a single-level storage and retrieval unit (also referred to as "shuttle"). In this case, the storage and retrieval unit can operate only a single storage level via a load handling device. Yet a storage and retrieval unit can also be configured as a multi-level storage and retrieval unit. In this case, the storage and retrieval unit can operate multiple storage levels via a load handling device. In a rack storage system, in particular multiple storage and retrieval units (both single-level storage and retrieval units and multi-level storage and retrieval units) can be provided in one and the same rack aisle which operate in particular on different "travel planes."

Also multiple "maintenance levels" can be provided in the rack storage system which may in particular be formed by walkways for assembly and maintenance staff.

The rack storage system may also comprise a control system, which generally serves the controlling of the moving components of the rack storage system, for example the controlling of the storage and retrieval units and of the loading good lifting device(s). The control system can also be connected to a superordinate central computer of a storage and order-picking system which comprises the rack storage system.

Further advantageous designs and further advancements of the invention result from the sub-claims as well as from the description in combination with the figures.

Advantageously, a drive axle of the first drive motor is aligned in the x direction. In this way, the drive motor can be arranged in the rack aisle in a particularly space-saving manner, whereby a passing of the loading good lifting device, for example by maintenance staff, is possible in a simple manner. In particular, this configuration is suitable whenever the rack aisle is relatively narrow and/or whenever multiple loading good lifting devices are arranged facing one another in the rack aisle (in particular as mirror images about the x-axis). Furthermore, the overall height of the loading good lifting device(s) is comparatively short inside the rack aisle on account of the drive motor being arranged horizontally. Accordingly, the storage and retrieval units can pass the loading good lifting device at only a low height. If the loading good lifting device is countersunk into the floor, only a shallow pit is required.

Yet it is also advantageous if a drive axle of the first drive motor is aligned vertically. Also in this configuration, a passing of the loading good lifting device(s) is possible in a simple manner, and the configuration is, again, suitable in particular for relatively narrow rack aisles and/or for the case that multiple loading good lifting devices are arranged facing one another in the rack aisle (in particular as mirror images about the x-axis).

It is further particularly advantageous if
the first storage rack comprises (first) mounting beams which are affixed (for example preferably releasably affixed via connection means) to the (first) front uprights in addition to the (first) front longitudinal beams and extend parallel to the (first) front longitudinal beams, and
the (first) vertical mast comprises a mounting section facing the rack aisle with which the first loading good lifting device is mounted on the (first) mounting beams (for example preferably releasably affixed via connection means).

In the above context, it is also of advantage if the second storage rack comprises (second) mounting beams which are affixed (for example preferably releasably affixed via connection means) to the (second) front uprights in addition to the (second) front longitudinal beams and extend parallel to the (second) front longitudinal beams.

As mentioned in the beginning, the guide tracks for the storage and retrieval unit are located on the front longitudinal beams of the first and second storage racks. Yet the vertical mast of the loading good lifting device is not, as is customary, connected to the front longitudinal beams but to the separately provided mounting beams. This is in particular of advantage whenever the lifting frame is adjusted on the vertical mast in a highly dynamic manner. The term "highly dynamic" in the given context means in particular speeds of >6 m/s and accelerations of >7 m/s². The decoupling of the connection points for the vertical mast from the front longitudinal beams (and thus from the guide rails for the storage and retrieval unit) ensures that the oscillations induced by the dynamic adjustment movements of the lifting frame are not immediately transmitted to the front longitudinal beams (and thus to the guide rails for the storage and retrieval unit).

In a preferred embodiment, the shelves are furthermore mounted on the front longitudinal beams. The proposed measures ensure, also in this case, that hardly any oscillations which are caused by the adjustment movements of the at least one lifting frame are transmitted to the shelves. An undesired movement or "wandering" of the loading goods deposited in the storage locations, such as it can occur in the prior art and may cause problems when retrieving the loading goods, will therefore not occur.

The proposed measures ensure that the transmission of oscillations from the loading good lifting device can be reduced or even avoided. In particular, the vertical mast can be connected to multiple mounting beams arranged vertically on top of one another in multiple mounting sections located vertically on top of one another. In particular screws may be provided as connection means, yet also a connection by rivets or clamps is conceivable.

In a favorable variant embodiment, the rack storage system comprises walkways which are arranged in the rack aisle on maintenance levels located on top of one another and affixed (for example preferably releasably affixed via connection means) to the mounting beams of the first storage rack and to the mounting beams of the second storage rack. These measures ensure that assembly and/or maintenance levels are provided in the rack storage system which can be entered by assembly and/or maintenance staff in order to carry out assembly work and/or maintenance work in the rack storage system. Again, screws, rivets or clamps can be provided as connection means.

It is advantageous if the connection between the (first) vertical mast and one of the (first) mounting beams is made by a bent or cranked (i.e. doubly bent) fastening element. The bent and/or cranked construction of the fastening element allows, on the one hand, a solid and very simple mounting of the vertical mast on the mounting beam, and, on the other hand, also a reduction of the transmission of oscillations between the loading good lifting device and the loading goods. Specifically, the fastening element can essentially act as a bending spring in this embodiment. When selecting the material for the fastening element, it should be ensured that the material has sufficient dampening properties to prevent undesired resonance phenomena.

It should generally be noted that the bending spring effect is not bound to a bent or cranked construction of the fastening element. Rather, a free bending length between the connecting point of the vertical mast to the fastening element and the connecting point of the mounting beam to the fastening element is authoritative.

In particular, it is of advantage if the bent or cranked fastening element and/or a distance plate arranged between the (first) vertical mast and one of the (first) mounting beams is manufactured from a material with an elastic modulus of less than 40,000 MPa. The low elastic modulus ensures that a transmission of oscillations between the loading good lifting device and the storage and retrieval units is effectively avoided or at least reduced. In particular, this applies to a bent and/or cranked fastening element which enables a particularly high dampening of oscillations. However, it is generally also of advantage if distance plates which are inserted in different strengths for the perpendicular alignment of the vertical mast and/or for equalizing the distance between the vertical mast and the mounting beams are produced from an appro-priate material. In particular plastics, such as, for example, Teflon or fiber reinforced plastic, are suitable as material. Yet it is also conceivable to use rubber or wood (in particular plywood), which equally has excellent dampening properties. Evidently, also the use of other composite materials than fiber reinforced plastic is conceivable, for example plastic-wood compound materials. Even though the distance plate is preferably manufactured from a material with an elastic modulus of less than 40,000 MPa, it is generally conceivable for the distance plate to be manufactured from a metal (in particular from steel). In this case, the distance plate can be referred to as a "spacer sheet." It should also be noted in this context that one distance plate (a spacer sheet) or multiple distance plates (multiple spacer sheets) can be inserted between the vertical mast and the mounting beams.

Advantageously, the vertical mast has a plurality of mast segments which are jointed vertically on top of one another in an essentially gap-free manner (preferably with the help of a stop connection). It is particularly advantageous in this context if the first lifting guide for guiding the first (and second) lifting frame is subdivided in a vertical direction by complementary-shape butt joints (for example with the help of a tongue-and-groove connection between the individual lifting guide segments). The proposed measures ensure that, on the one hand, the transport of the vertical mast and its placement in the building is facilitated on the erection site, on the other hand, the division of same enables a modular structure of the loading good lifting device. Specifically, depending on the stipulated lifting height, different numbers of mast segments can be assembled to form a vertical mast. The mast segments are preferably screwed to one another.

It is further advantageous if a division between the mast segments is arranged offset in a vertical direction to the butt joints of the lifting guide. The butt joint of the lifting guide is therefore not arranged at the same height level as a division between two mast segments. An (undesired) displacement of mast segments in relation to one another, such as it may occur, for example, by tensions of the mast segments in relation to one another, has no, or only a minor, effect on the butt joints of the lifting guides. This ensures that the occurrence of vibrations and/or oscillations during the movement of the lifting frame can be kept low. Further, a bending stress which is discharged into the lifting guides on the mast by the lifting sledge is guided over and beyond the joint of the mast elements.

In another favorable variant embodiment of the rack storage system, the first lifting guide comprises a first guide rail and a second guide rail for guiding the first lifting frame which extend separately and in parallel in a longitudinal direction of the vertical mast and are preferably releasably connected to the vertical mast via fastening means. In particular, the first guide rail and the second guide rail are formed by bright-drawn or ground, flat rolled steel which has tapped holes for affixing same to the vertical mast. Despite an inexpensive and modular construction, the lifting frame on the first lifting guide runs steadily, and only small vibrations are discharged into the vertical mast.

It is further favorable if the vertical mast and the first lifting guide, as well as the front uprights and rear uprights of the first storage rack, are produced from the same material, in particular from steel. The proposed measures ensure in particular that temperature-related tensions and/or play between the components of the rack storage system can be avoided. This variant embodiment is therefore suitable in particular for rack storage systems which are to be used in a broad temperature spectrum or are exposed to variations in temperature. This applies to rack storage systems, for example, which are erected at ambient temperature but are then operated at very low temperatures, such as this is the case for deep-freeze stores, for example. Generally, the temperature range in which rack storage systems are used is about −40° C. to +40° C. By avoiding play between the components, in particular the noise emission during operation of the loading good lifting device and the storage and retrieval units can be reduced.

It is also of advantage in the above context if the front longitudinal beams as well as the rear longitudinal beams and/or the mounting beams are additionally produced from the same material as the vertical mast, the first lifting guide and the front and rear uprights. This ensures that temperature-related tensions and/or play between the components of the rack storage system can be avoided even more efficiently.

It is furthermore advantageous if the energy-absorbing deformation means
   comprises a force distribution plate having an impact area for the first lifting frame,
   comprises a honeycomb element below the force distribution plate which is plastically deformable by application of force and which at least partially absorbs an impact energy generated in case of a collision of the first lifting frame with the force distribution plate and
   comprises a mounting plate below the honeycomb element for mounting the deformation means.

The lifting frame has only a small surface area in a vertical projection and/or the contact area between the lifting frame and the deformation means is only small. The force distribution plate ensures that the forces occurring upon the impact of the lifting frame are nevertheless discharged into the honeycomb element evenly, and the honeycomb element is deformed evenly. It would generally also be possible to arrange a force distribution plate on the lifting frame. In order to keep the moving mass of the lifting frame small, however, it is of advantage to mount the force distribution plate permanently on the honeycomb element. Preferably, the force distribution plate is connected, in particular glued, to the honeycomb element. Preferably, also the mounting plate is connected, in particular glued, to the honeycomb element.

It is favorable if hollows of the honeycomb element extend in a vertical direction. The honeycomb structure enables a favorable stiffness-to-volume ratio and/or a favorable stiffness-to-weight ratio. This means that the strain element is small and/or light despite a high energy absorption during the deformation. This ensures that a strain element with only a short overall height can be provisioned, which enables the movement of the lifting frame to just above floor level. Generally, approximately 75% of the overall height of the honeycomb element can be made use of for dampening the impact. In addition, the compression behavior of the strain element is easily influenced due to the honeycomb structure. Finally, this also enables low production and replacement costs.

Advantageously, the bending stiffness of the force distribution plate about a horizontal axis is at least twice as high as the compression stiffness of the honeycomb element in a vertical direction. It is also favorable if a difference of the vertical deformation of the strain element is a maximum of 10% of the overall height of the intact strain element if the maximum deformation is 75% of the overall height of the intact strain element. In other words, the smallest deformation is then 65% of the overall height of the intact strain element.

These measures equally contribute to the fact that the forces occurring upon the impact of the lifting frame on the deformation means are discharged into the honeycomb element evenly. In other words, the honeycomb element should give in (collapse) and deform before the force distribution plate deforms. The factor two is to be understood as an advantageous guideline. Generally, also other values are conceivable, as the kind of discharge of force into the honeycomb element via the contact area depends strongly on the design of the lifting frame, of the force distribution plate and of the honeycomb element.

It is further particularly advantageous if the first loading good lifting device
   comprises a first additional lifting drive having a first additional drive station and a first additional traction means drive coupled thereto,
   comprises a first additional lifting frame supported on the first vertical mast so as to be displaceable along the first lifting guide or along a first additional lifting guide which is vertically movable with the help of the first additional lifting drive, and
   comprises a first additional transport device arranged on the first additional lifting frame which is configured at least for transporting the loading goods between a provisioning device and the first additional transport device in the x direction.

This ensures that the storage capacity and/or retrieval capacity of the loading good manipulation unit can be increased. The capacity is essentially doubled if a second lifting frame is provided, and tripled if a third lifting frame is provided, etc. The guiding of the lifting frame on the same vertical mast, and in particular on the same lifting guide, enables the increase of the storage capacity and/or retrieval capacity of the loading good manipulation unit advantageously while the dimensions of the base area remain unchanged.

It is additionally advantageous if the first lifting drive and the first vertical mast are arranged on a common base plate. In particular, the base plate can enable means for aligning the components arranged thereupon with one another. These means can be formed, for example, by recesses (for example bores), depressions and/or elevations. This ensures that the first lifting drive and the first vertical mast are "automatically" aligned with each other during the mounting of the loading good lifting device. Effortful measures for aligning the two components with each other are therefore not required.

It is particularly advantageous if the base plate is aligned (leveled) and mounted on an installation surface in a first step before the vertical mast is placed onto the base plate from above and affixed to it in a second step. The floor, or a mezzanine floor, of the building in which the rack storage system is erected, for example, can serve as installation surface. The vertical mast is therefore placed on a fixed and horizontally aligned mounting surface, whereby also a perpendicular alignment of the vertical mast is already ensured. This simplifies the mounting of the loading good lifting device. The traction means drive is preferably mounted after affixing the vertical mast to the base plate and/or after affixing the vertical mast to the storage rack (in particular to its mounting beams). The traction means can then be guided around a drive wheel, a top/bottom deflection wheel, and around at least one guide wheel. The top deflection wheel is mounted in the head region of the mast. The bottom deflection wheel is mounted in the base region of the mast. The ends of the traction means can be interconnected, and a tensioning force (pretension) can be set in the traction means via a tensioning mechanism.

In another favorable variant embodiment of the rack storage system, the first lifting drive and the energy-absorbing deformation means are arranged on a common base plate. In particular, the base plate can, again, enable means for aligning the components arranged thereupon with one another, which can be formed, for example, by recesses (for example bores), depressions and/or elevations. Effortful measures for aligning the components with each other are therefore, again, not required.

It is also advantageous if the drive station of the first lifting drive and the additional drive station of the first additional lifting drive are arranged on a common base plate. The proposed measures enable a modular structure of the loading good manipulation unit. Depending on the stipulated storage capacity and/or retrieval capacity of the loading good manipulation unit, one drive motor is arranged on the base plate or multiple drive motors are arranged on the common base plate. The base plate can, again, enable means for aligning the components arranged thereupon with one another. These means can be formed, for example, by recesses (for example bores), depressions and/or elevations. Effortful measures for aligning the two components with each other are therefore, again, not required.

It is further favorable if
an acceleration sensor for detecting at least one acceleration in a vertical direction is arranged on the first (and second) lifting frame and/or
the first loading good lifting device comprises an optical distance-measuring sensor for detecting the vertical position of the first (and second) lifting frame and/or means for the optical data transmission to or from the first (and second) lifting frame.

With the help of an acceleration sensor, in particular an excessive vertical acceleration such as it occurs during the undesired falling of the lifting frame can be detected. Countermeasures such as the activation of a fall brake, for example, can then be initialized. In particular if multiple lifting frames are guided on one vertical mast, the lifting frame which is arranged below the falling lifting frame can be used for braking the falling lifting frame. Here, the speed of the bottom lifting frame is adjusted, if possible, to the speed of the falling lifting frame, and, in another step, the bottom lifting frame is decelerated after the contact with the falling lifting frame in order to brake the falling lifting frame. It is also conceivable that the bottom lifting frame is simply moved to its bottom idle position, so that the traction means connected thereto is not damaged upon the impact of the falling lifting frame. It is further conceivable that the acceleration sensor is used for detecting undesired and/or unexpected vibrations and oscillations such as they can occur, for example, in case of a fault of the loading good lifting device (such as a broken bearing on a guide roller of the lifting frame).

Generally, the detection of an excessive vertical acceleration is not bound to the use of an acceleration sensor, but also an optical distance-measuring sensor can, of course, be used for this purpose, namely by calculating the time differential of its position signal.

The data transmission to or from the first lifting frame can be done in particular with the help of the optical data transmission. This technology is also known as "optical data transceiver." In particular also the combination and/or integration of an optical distance-measuring sensor and the optical data transmission in a single device is conceivable. The structure of the loading good lifting device is then therefore particularly compact.

It is also of advantage if
the loading good manipulation unit has a second buffer device which is configured like the first buffer device, and has a second loading good lifting device which is configured like the first loading good lifting device, wherein in particular a second vertical mast of the second loading good lifting device is affixed to the second storage rack, and
the rack storage system has a second conveying system for transporting loading goods to the second loading good lifting device and for transporting loading goods from the second loading good lifting device which is adjoined to the loading good manipulation unit.

The second loading good lifting device can correspondingly in particular have the following features (individually or in any combination):
a drive axle of a drive motor of the second drive station is aligned in the x direction,
a drive axle of a drive motor of the second drive station is vertically aligned,
the second vertical mast has an open profile cross section, wherein the profile cross section comprises a profile base, profile legs protruding from same (and extending in parallel) and mounting legs angled off the free ends of the profile legs on which the vertical mast is affixed to the second storage rack,
the connection between the second vertical mast and one of the second mounting beams is made by a bent or cranked (i.e. doubly bent) fastening element,
the bent or cranked fastening element and/or a distance plate arranged between the second vertical mast and one of the second mounting beams is manufactured from a material with an elastic modulus of less than 40,000 MPa,
the second vertical mast has a plurality of mast segments which are jointed vertically on top of one another in an essentially gap-free manner (preferably with the help of a stop connection),
the lifting guide for guiding a lifting frame is subdivided in a vertical direction by complementary-shape butt joints (for example with the help of a tongue-and-groove connection between the individual lifting guide segments),
a division between the mast segments is arranged offset in a vertical direction to the butt joints of the lifting guide,
the lifting guide for guiding a lifting frame comprises a first guide rail and a second guide rail which extend separately and in parallel in a longitudinal direction of the second vertical mast and are preferably releasably connected to the second vertical mast via fastening means,
the second vertical mast and the second lifting guide, as well as the front uprights and rear uprights of the second storage rack, are produced from the same material, in particular from steel. Optionally, also the front longitudinal beams as well as the rear longitudinal beams and/or the mounting beams of the second storage rack are produced from the same material,
the second loading good lifting device comprises a second additional lifting drive having a second additional drive station and a second additional traction means drive coupled thereto, an additional lifting frame supported on the second vertical mast so as to be displaceable along the second lifting guide or along a second additional lifting guide which is vertically movable with the help of the second additional lifting drive, and a second additional transport device arranged on the additional lifting frame which is configured at least for transporting the loading goods between a provisioning device and the second additional transport device in the x direction, an acceleration sensor for detecting at least one acceleration in a vertical direction is arranged on the lifting frame and/or the second loading good lifting device comprises an optical distance-measuring sensor for detecting the vertical position of the lifting frame and/or means for the optical data transmission to or from the lifting frame, the second traction means drive of the second loading good lifting device comprises a traction means (in particular an endless traction means), and the second loading good lifting device has a tensioning mechanism for assembling the traction means and/or for setting a pretension force in the traction means which is arranged on the side of the second vertical mast facing the rack aisle.

The loading good manipulation unit can additionally comprise a (second) energy-absorbing deformation means which is fixedly mounted below the second lifting frame, in particular on a side of the second vertical mast facing away from the rack aisle (for example on a fixed component of the loading good manipulation unit or directly on a floor of the rack storage system). The second energy-absorbing deformation means may comprise a (second) force distribution plate having an impact area for the second lifting frame, comprise a (second) honeycomb element below the (second) force distribution plate which is plastically deformable by application of force and which at least partially absorbs an impact energy generated in case of a collision of the second lifting frame with the (second) force distribution plate, and comprise a (second) mounting plate below the (second) honeycomb element for mounting the deformation means. The hollows of the (second) honeycomb element can in particular extend in a vertical direction.

It is further conceivable that the second lifting drive and the second vertical mast are arranged on a common base plate, if applicable together with the first lifting drive and the first vertical mast.

It is also possible that the second lifting drive and the second energy-absorbing deformation means are arranged on a common base plate, if applicable together with the first lifting drive and the first energy-absorbing deformation means.

It is additionally conceivable that the drive station of the second lifting drive and the additional drive station of the second additional lifting drive are arranged on a common base plate, if applicable together with the drive station of the first lifting drive and the additional drive station of the first additional lifting drive.

BRIEF DESCRIPTION OF THE DRAWINGS

For the purpose of better understanding of the invention, it will be elucidated in more detail by means of the figures below.

These show in a respectively very simplified schematic representation.

DETAILED DESCRIPTION OF THE PREFERRED EMBODIMENTS

First of all, it is to be noted that, in the different embodiments described, equal parts are provided with equal reference numbers and/or equal component designations, where the disclo-sures contained in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

Figure 1:
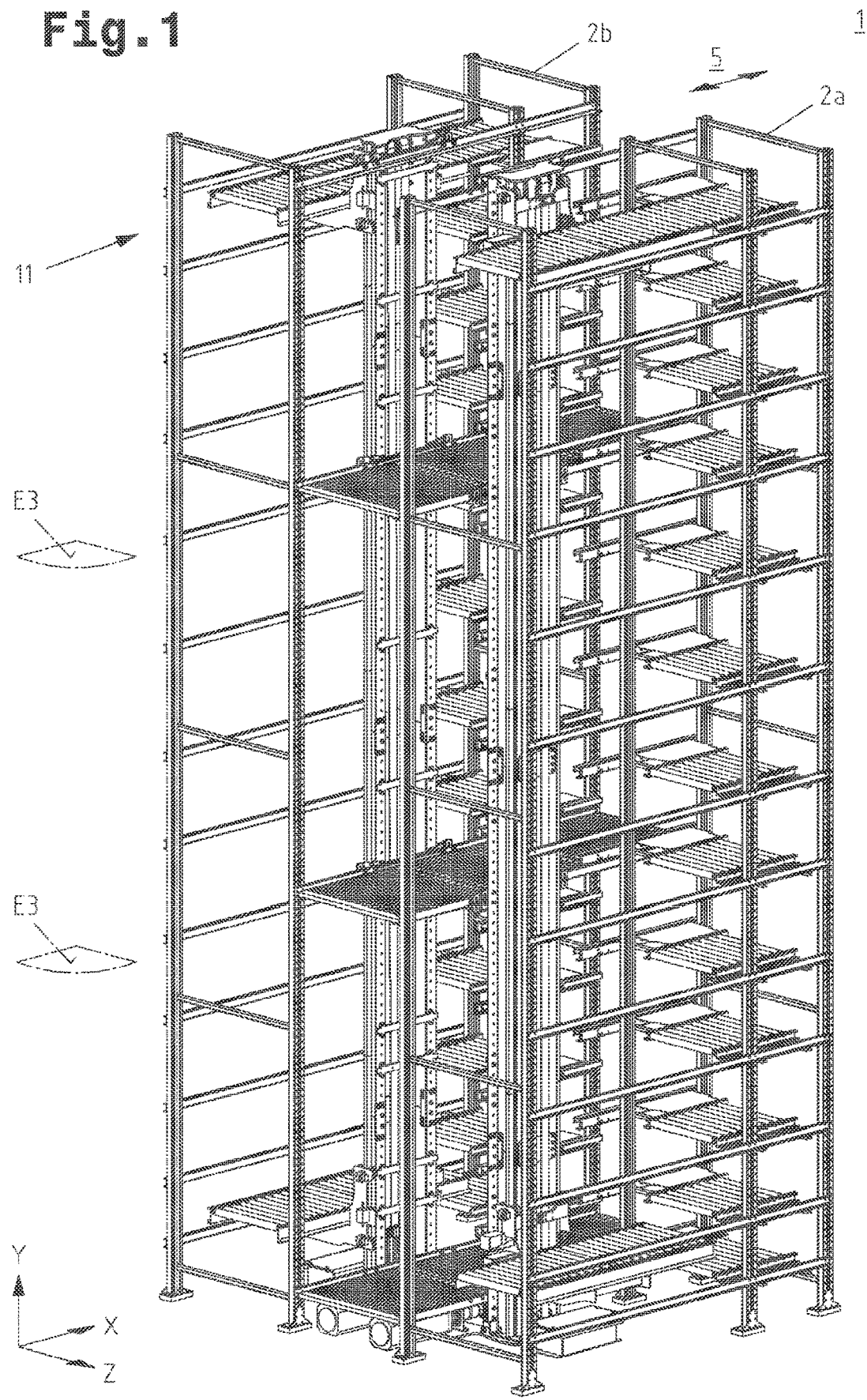
FIG. 1 a rack storage system with a partial section of storage racks and a loading good manipulation unit in an oblique view.
Figure 3:
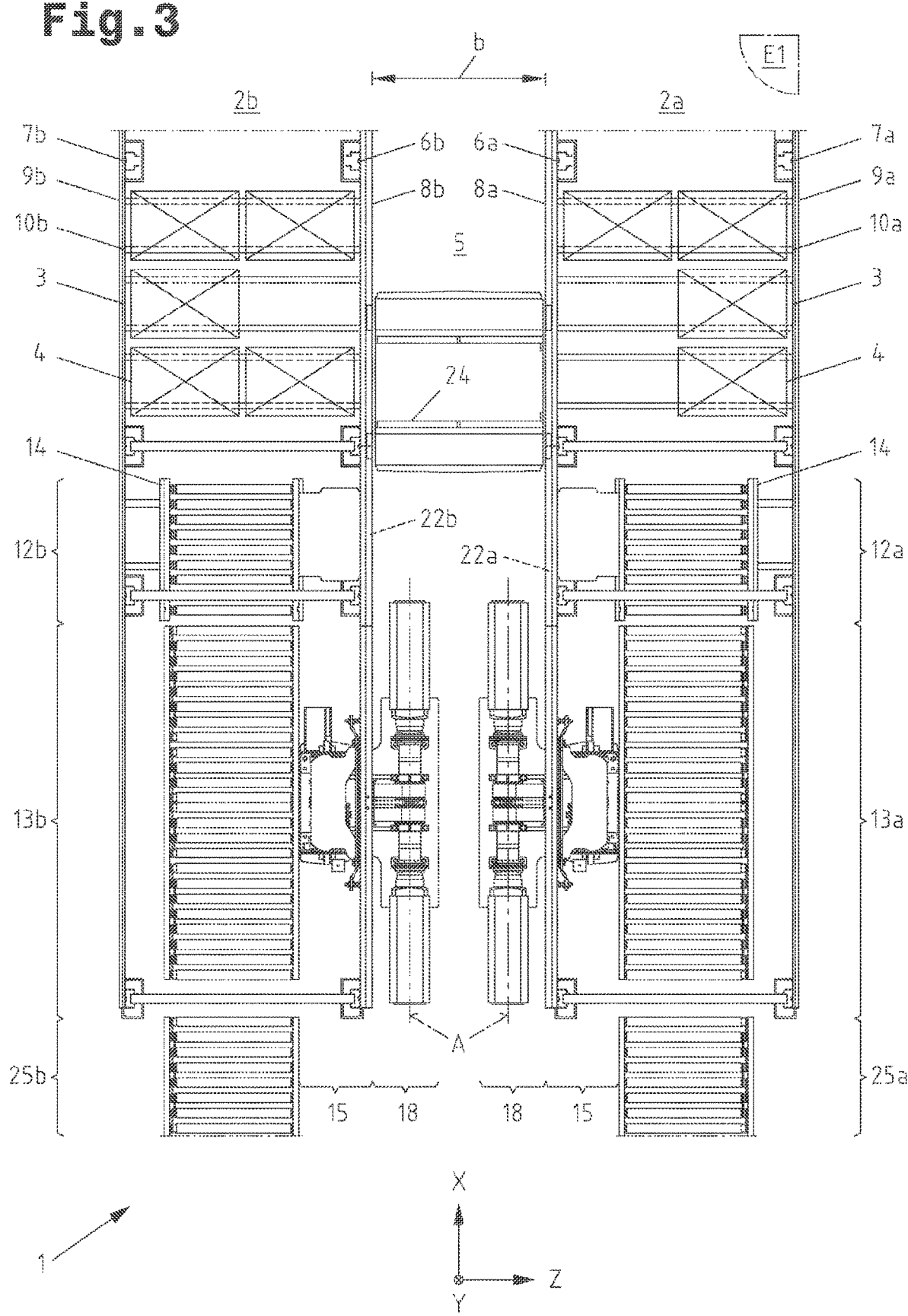
FIG. 3 a top view onto the rack storage system according to FIG. 1 with a partial section of the storage racks depicted in more detail and removed walkways, as well as schematically indicated conveying systems.

FIGS. 1 and 3 show an exemplary rack storage system 1. According to the embodiment shown, the rack storage system 1 comprises a first storage rack 2a having storage locations 3 for loading goods 4 which are arranged next to one another on storage levels E1 located on top of one another, as well as a second storage rack 2b having storage locations 3 for loading goods 4 which are arranged next to one another on storage levels E1 located on top of one another.

The first storage rack 2a and the second storage rack 2b face each other at a distance b in a horizontal z direction z, whereby a rack aisle 5 is configured between the first storage rack 2a and the second storage rack 2b which has a horizontal longitudinal axis extending in a x direction x which is aligned orthogonally to the z direction z.

The first storage rack 2a has front uprights 6a and rear uprights 7a, as well as front longitudinal beams 8a per storage level E1 (such as it is marked in FIG. 3, for example) which extend in the x direction x and are connected to the front uprights 6a, and rear longitudinal beams 9a per storage level E1 which extend in the x direction x and are connected to the rear uprights 7a. Shelves 10a having the storage locations 3 are arranged between the front longitudinal beam 8a and the rear longitudinal beam 9a per storage level E1.

The second storage rack 2b has front uprights 6b and rear uprights 7b, as well as front longitudinal beams 8b per storage level E1 (such as it is marked in FIG. 3, for example) which extend in the x direction x and are connected to the front uprights 7b, and rear longitudinal beams 9b per storage level E1 which extend in the x direction x and are connected to the rear uprights 7b. Shelves 10b having the storage locations 3 are arranged between the front longitudinal beam 8b and the rear longitudinal beam 9b per storage level E1.

The shelves 10a, 10b may in particular comprise crossbars and/or support bars extending in a z direction z, or be configured as a compartment shelf or as a grid shelf.

Furthermore, the rack storage system 1 comprises a loading good manipulation unit 11.

Figure 2:
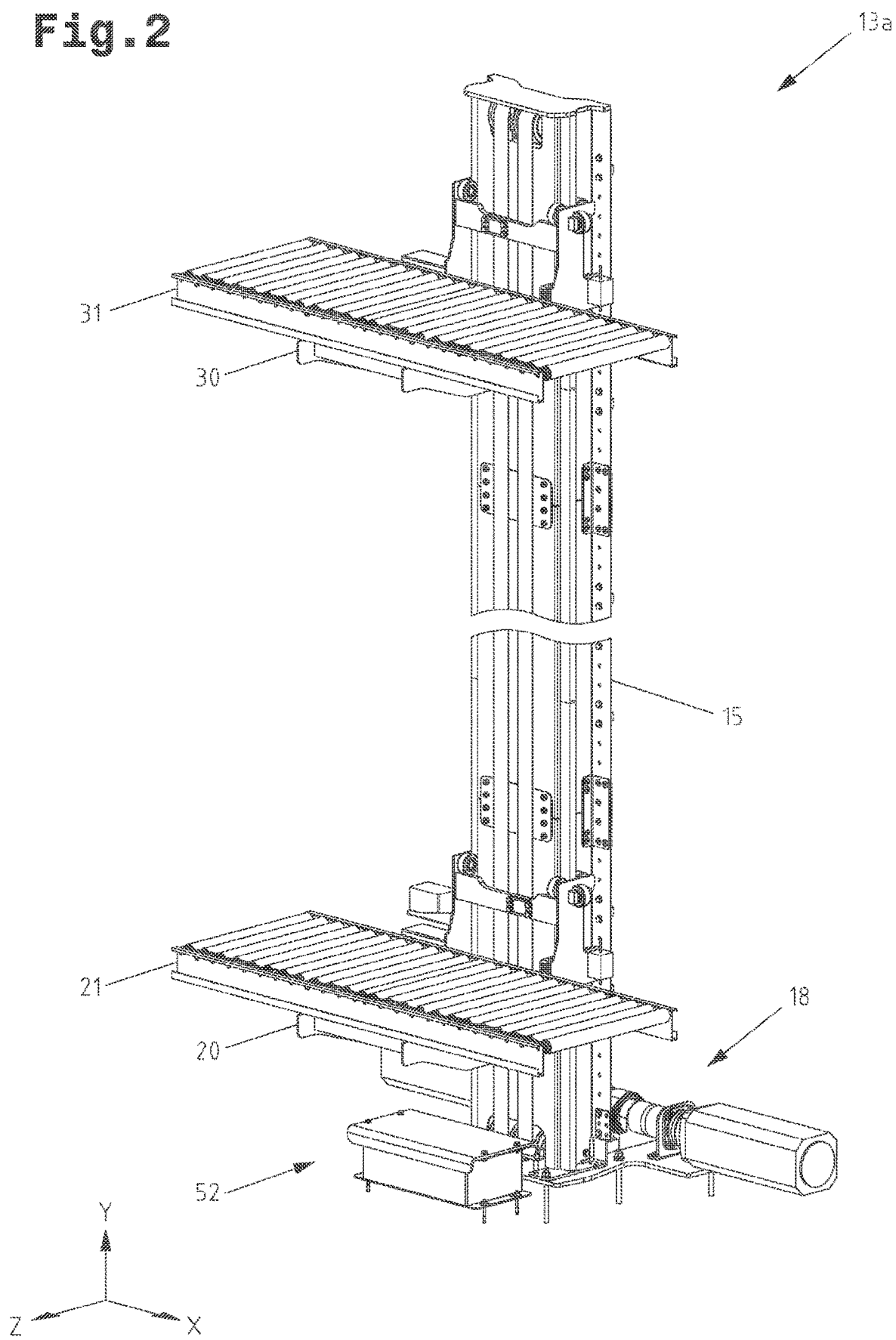
FIG. 2 a loading good lifting device and an (optional) deformation means of the loading good manipulation unit of FIG. 1 in an oblique view.

According to the embodiment shown, the loading good manipulation unit 11 comprises a first buffer device 12a offset laterally to the rack aisle 5 in the (positive) z direction z (see FIGS. 1 and 3), a first loading good lifting device 13a for storing and/or retrieving loading goods 4 (see FIGS. 1 to 3), a second buffer device 12b offset laterally to the rack aisle 5 in the (nega-tive) z direction z (see FIGS. 1 and 3), a second loading good lifting device 13b for storing and/or retrieving loading goods 4 (see FIGS. 1 to 3). The first loading good lifting device 13a is in particular arranged in the periphery of the rack aisle 5. The second loading good lifting device 13b is equally in particular arranged in the periphery of the rack aisle 5. According to the embodiment shown, the first/second loading good lifting devices 13a, 13b are arranged facing each other as mirror images about the x-axis.

Even though this is not mandatory, it may prove to be of advantage if the first loading good lifting device 13a serves exclusively the storing of loading goods 4 and the second loading good lifting device 13b exclusively the retrieval of loading goods 4, or vice versa.

The first buffer device 12a itself comprises provisioning devices 14 on at least some of the storage levels E1, which are respectively configured for buffering a loading good 4 or multiple loading goods 4 and are arranged adjacent in the x direction x on one of the sides of the first loading good lifting device 13a. Optionally, provisioning devices 14a can be provided on all storage levels E1.

The first loading good lifting device 13a (see FIGS. 2 to 5) comprises, again, a first vertical mast 15 having a first lifting guide 16, and a first lifting drive 17 having a first drive station 18 and a traction means drive 19. The first vertical mast 15 is in particular arranged in the periphery of the rack aisle 5, installed in a stationary manner and affixed to the first storage rack 2a. The first loading good lifting device 13a further comprises a first lifting frame 20 mounted on the first lifting guide 16 and vertically movable using the first lifting drive 17, which is connected to the traction means drive 19 of the first lifting drive 17. Furthermore, the first loading good lifting device 13a comprises a first transport device 21 arranged on the first lifting frame 20 which is configured at least for transporting the loading goods 4 between one of the provisioning devices 14 and the first transport device 21 in the x direction x. In the example shown, the transport device 21 comprises motorized conveyor rollers.

The first lifting frame 20 having the first transport device 21 is arranged on a side of the vertical mast 15 facing away from the rack aisle 5, and the first drive station 18, which comprises a first drive motor 26a, is arranged on a side of the vertical mast 15 facing the rack aisle 5. Here, the first drive motor 26a itself is arranged inside the rack aisle 5. This can be readily seen from FIGS. 3 and 4.

In the example depicted in FIGS. 2 to 5, the first loading good lifting device 13a comprises an optional first additional lifting drive 27 having a first additional drive station 28 and a first additional traction means drive 29 coupled thereto, as well as a first additional lifting frame 30 supported on the first vertical mast 15 so as to be displaceable along the first lifting guide 16, which is vertically movable with the help of the first additional lifting drive 27. In addition, the first loading good lifting device 13a comprises a first additional transport device 31 arranged on the first additional lifting frame 30 which is configured at least for transporting the loading goods 4 between a provisioning device 14 and the first additional transport device 31 in the x direction x. The first lifting frame 20 and first additional lifting frame 30 are inde-pendently controllable via the lifting drive 17 and additional lifting drive 27, but not rigidly interconnected.

At least one first conveying system 25a (schematically depicted in FIG. 3 exclusively) for transporting loading goods 4 to the first loading good lifting device 13a and for transporting loading goods 4 from the first loading good lifting device 13a is adjoined to the loading good manipulation unit 11, wherein the first loading good lifting device 13a connects, in terms of conveying, the first conveying system 25a and the provisioning devices 14.

Figure 9:
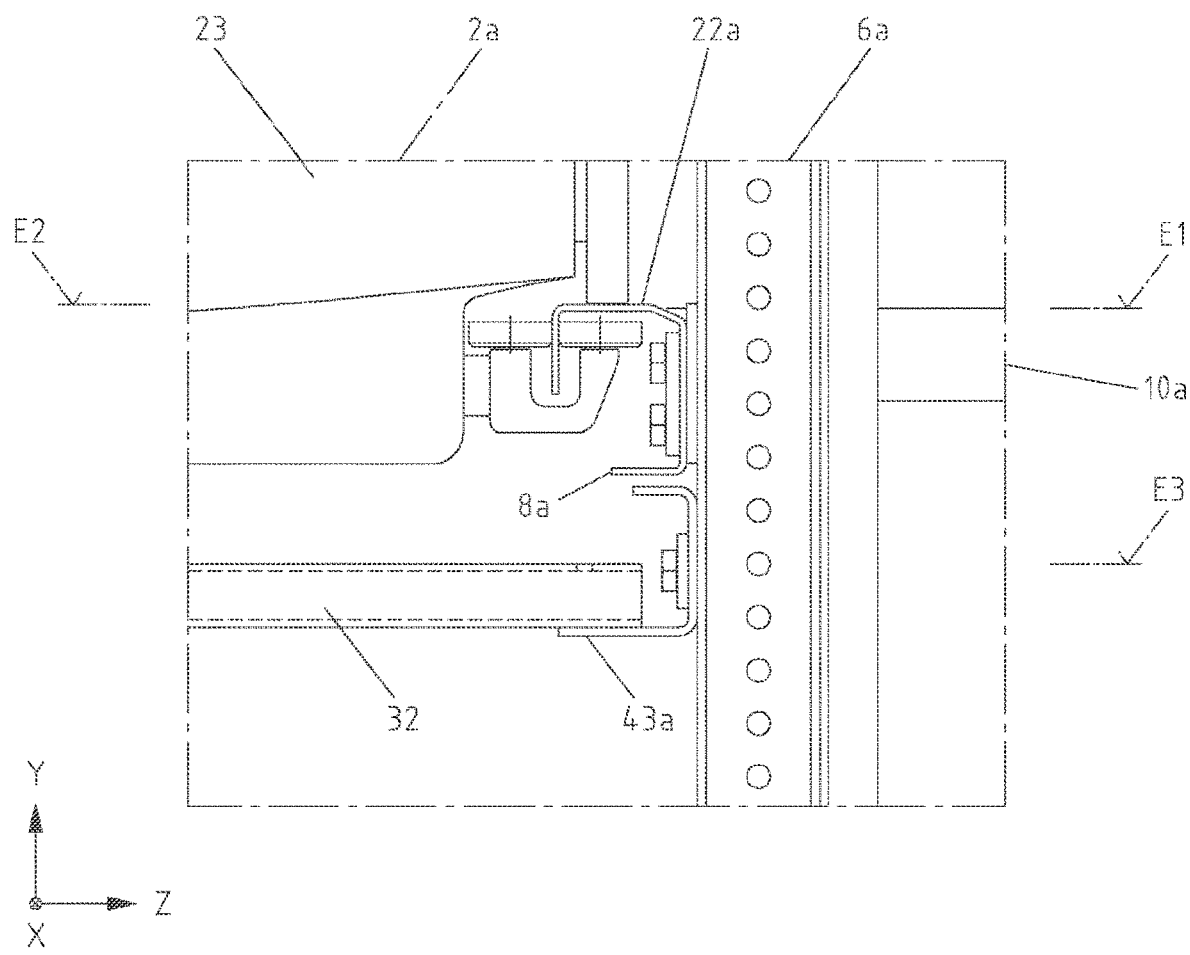
FIG. 9 a detail view onto a front upright, a front longitudinal beam, a mounting beam of a storage rack, a walkway and a storage and retrieval unit of the rack storage system according to FIG. 1.

As marked in FIGS. 3 and 9, guide tracks 22a, 22b are arranged, respectively in pairs, on the front longitudinal beams 8a of the first storage rack 2a and on the front longitudinal beams 8b of the second storage rack 2b in horizontal travel planes E2 located on top of one another which extend in a x direction x along the first storage rack 2a, along the second storage rack 2b and along the provisioning devices 14.

The rack storage system 1 has at least one automated storage and retrieval unit 23 (as schematically indicated in FIGS. 3 and 9) having at least one load handling device 24 for transporting the loading goods 4 between the storage locations 3 and the provisioning devices 14 which is displaceable in the x direction x along the guide tracks 22a, 22b on a travel plane E2 in front of the storage locations 3 and in front of the provisioning device 14.

As described above, the loading good manipulation unit 11 comprises an optional second buffer device 12b which is configured like the first buffer device 12a, and an optional second loading good lifting device 13b which is configured like the first loading good lifting device 13a. Here, the second vertical mast 15 of the second loading good lifting device 13b is in particular affixed to the second storage rack 2b. Further, at least one second conveying system 25b for transporting loading goods 4 to the second loading good lifting device 13b and for transporting loading goods 4 from the second loading good lifting device 13b, adjoined to the loading good manipulation unit 11 (schematically depicted in FIG. 3 exclusively), is provided.

Figure 6:
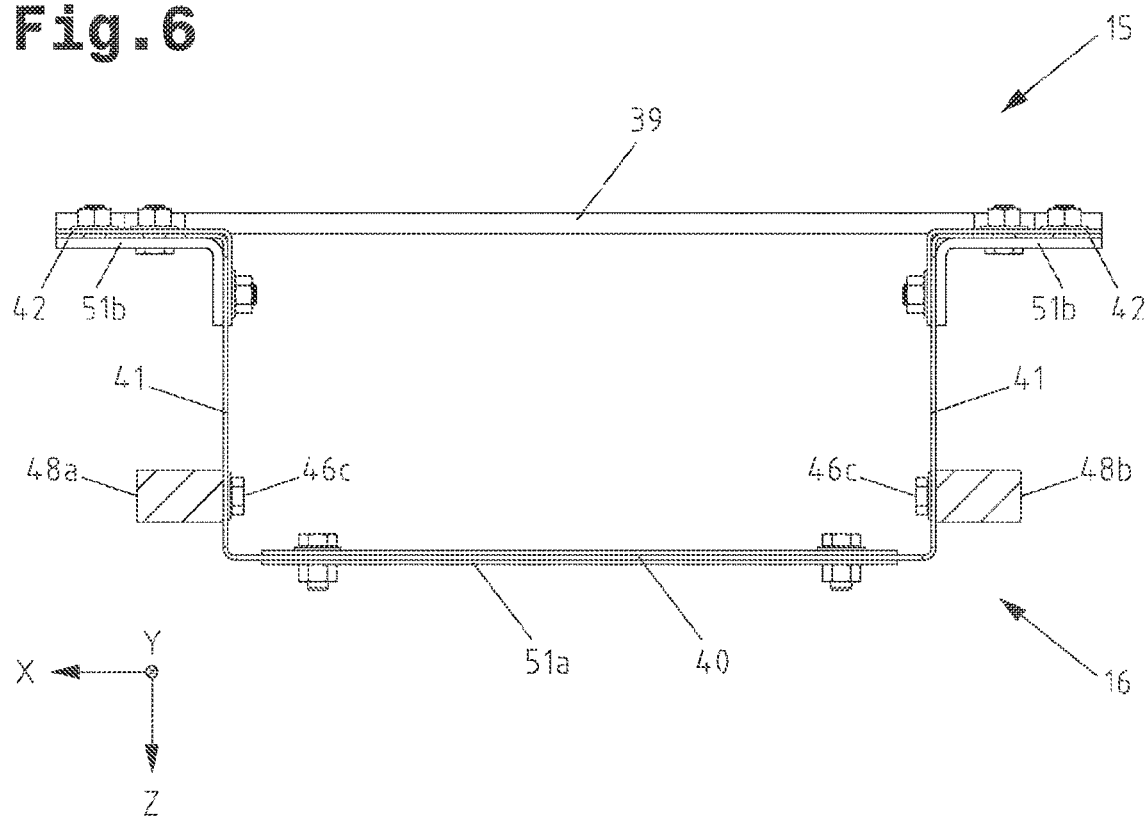
FIG. 6 a horizontal section through the vertical mast of a loading good lifting device.
Figure 7:
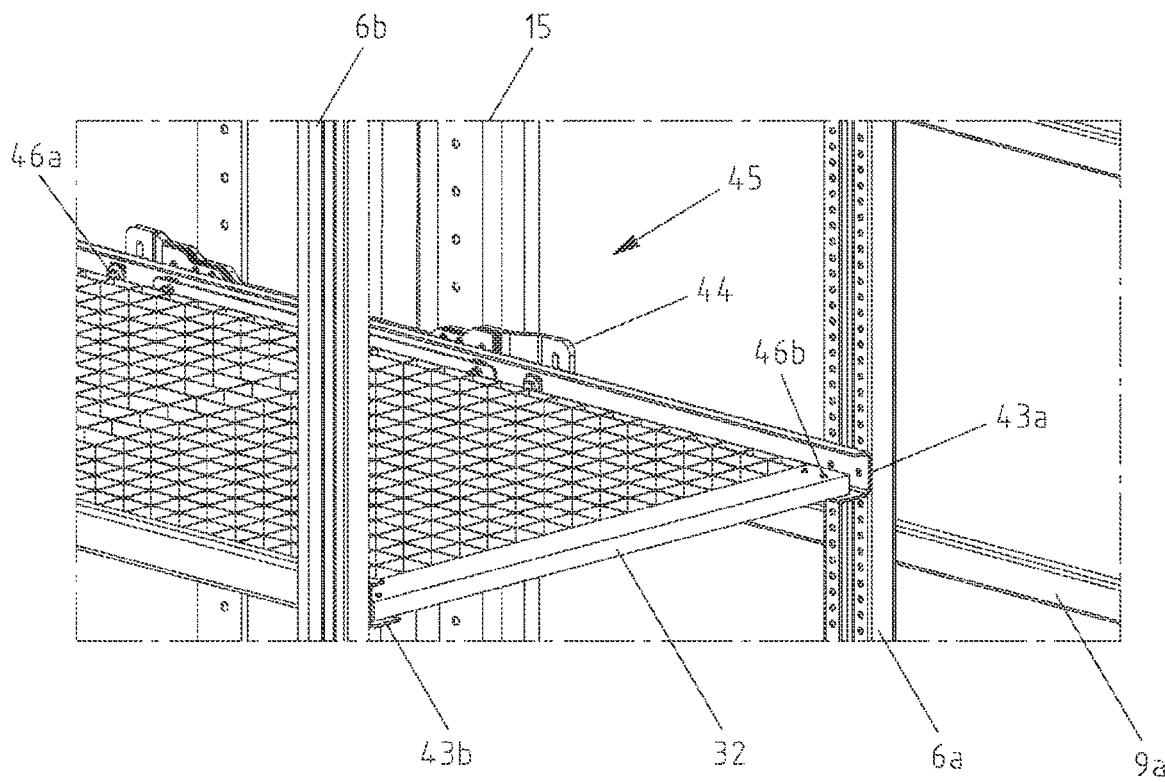
FIG. 7 a detail view of the rack storage system in the region of the connection of the vertical mast to a mounting beam in an oblique view.

Different embodiments of this loading good manipulation unit 11 (having a first loading good lifting device 13a and a first buffer device 12a, as well as a second loading good lifting device 13b and a second buffer device 12b) are described in WO 2013/090970 A2, FIGS. 6, 16 and WO 2016/033628 A2, FIGS. 1, 6, 7, for example.

In the example shown, the first loading good lifting device 13a and the second loading good lifting device 13b thus respectively have a lifting frame 20 and an additional lifting frame 30, which preferably have essentially identical structures and are driven and controlled essentially in the same manner. Also, in this variant embodiment, the part of the loading good manipulation unit 11 assigned to the first storage rack 2a has essentially the same structure as the part of the loading good manipulation unit 11 assigned to the second storage rack 2b. For this rea-son, the functioning of the loading good manipulation unit 11 is explained in detail below only for the lifting frame 20 operating in the region of the first storage rack 2a and the components interacting with same. The technical teachings specified there can be analogously applied to the additional lifting frame 30 and the components interacting with same, as well as to the part of the loading good manipulation unit 11 assigned to the second storage rack 2b. Embodiments which have both a first loading good lifting device 13a and a second loading good lifting device 13b, if applicable, are specified in brackets below. In particular, this also applies to the cases where both a mounting beam 43a and a mounting beam 43b are provided, as well as cases with two storage racks 2a, 2b.

The additional lifting frame 30 ensures that the storage capacity and/or retrieval capacity of the loading good manipulation unit 11 and/or of the first/second loading good lifting devices 13a, 13b can be increased. The capacity is essentially doubled if—as shown in the example—an additional lifting frame 30 is provided, and tripled if yet another additional lifting frame 30 is provided, etc. The guiding of the lifting frame 20 and of the additional lifting frame 30 on the first vertical mast 15, and in particular on the first lifting guide 16, enables the increase of the storage capacity and/or retrieval capacity of the loading good manipulation unit 11 advantageously while the dimensions of the base area remain unchanged.

If the first loading good lifting device 13a exclusively comprises a single lifting frame 20, the additional lifting drive 27 will be obsolete. The same applies also to the second loading good lifting device 13b, if provided.

FIG. 3 shows the rack storage system 1 in a top view with the indicated storage racks 2a, 2b and the indicated storage and retrieval unit 23. It can be readily seen from FIG. 3 in particular that the provisioning devices 14 of the first buffer device 12a are arranged adjacent in the x direction x on one of the sides of the first loading good lifting device 13a (namely on the top side in the depiction). Yet it would also be conceivable that the provisioning devices 14 are arranged adjacent in the x direction x at both sides of the first loading good lifting device 13a.

In the example of FIG. 3, the first loading good lifting device 13a may serve exclusively the storage of loading goods 4, and the second loading good lifting device 13b exclusively the retrieval of loading goods 4 (or also vice versa). The provisioning devices 14 adjacent to the first loading good lifting device 13a then serve the storage of loading goods 4, and the provisioning devices 14 adjacent to the second loading good lifting device 13b then serve the retrieval of loading goods 4 (or also vice versa).

The transport device 21 can be formed, for example, by a conveying means or a load handling device, such as this is described in WO 2013/090970 A2, for example.

In the example shown, the provisioning devices 14 are configured as active provisioning devices and respectively comprise a conveying means. Specifically, the conveying means is formed here by multiple motor-driven conveyor elements, such as by multiple motor-driven conveyor rollers. Yet the provisioning devices 14 may also be configured as passive provisioning devices and respectively comprise a stationary supporting table (without conveyor elements) for buffering one or multiple loading goods 4.

The special configuration of the drive motor 26a of the drive station 18 (if exclusively the lifting frame 20 and the transport device 21 are provided), or of the drive motors 26a, 26b of the drive station 18 and the additional drive station 28 (if also the additional lifting frame 30 and the additional transport device 31 are provided), ensures that the drive motor 26a and/or the drive motors 26a, 26b is and/or are easily accessible from the rack aisle 5, whereby the mounting and the maintenance of same is possible in a simple manner. Furthermore, the lifting frame 20 can travel particularly close to the floor, as the drive motors 26a, 26b are arranged outside of the motion travel of the lifting frame 20 (and not below it, like in the prior art). A bottom approach height (i.e. a bottommost vertical position of the lifting frame 20 on the vertical mast 15) is in particular less than 500 mm, in particular 375 mm.

In the example shown, the drive axles A (see FIG. 3) of the drive motors 26a, 26b of the first loading good lifting device 13a (or the drive motors 26a, 26b of the first and second loading good lifting devices 13a, 13b) are aligned in the x direction x. In this way, the drive motors 26a, 26b can be arranged in the rack aisle 5 in a particularly space-saving manner, whereby a passing of the loading good lifting device(s) 13a, 13b, for example by maintenance staff, is possible in a simple manner. In particular, this configuration is suitable if the rack aisle 5 is relatively narrow and/or if, such as this is the case in the example shown, multiple loading good lifting devices 13a, 13b are arranged facing one another in the rack aisle 5 (here facing one another as mirror images about the x-axis). Furthermore, the overall height of the loading good manipulation unit 11 is comparatively short inside the rack aisle 5 on account of the drive motors 26a, 26b being arranged horizontally. Accordingly, the storage and retrieval units 23 can pass the loading good lifting devices 13a, 13b at only a low height. Also walkways 32 can be arranged on a comparatively low maintenance level E3. If the loading good lifting devices 13a, 13b are countersunk into the floor, only a shallow pit is required.

Alternatively, it would also be conceivable that the drive axles A of the drive motors 26a, 26b are aligned vertically (not depicted). Also in this configuration, a passing of the loading good manipulation unit 11 is possible in a simple manner, and the configuration is, again, suitable in particular for relatively narrow rack aisles 5 and/or for the case that multiple loading good lifting devices 13a, 13b are arranged facing one another in the rack aisle 5 (in particular as mirror images about the x-axis).

Figure 4:
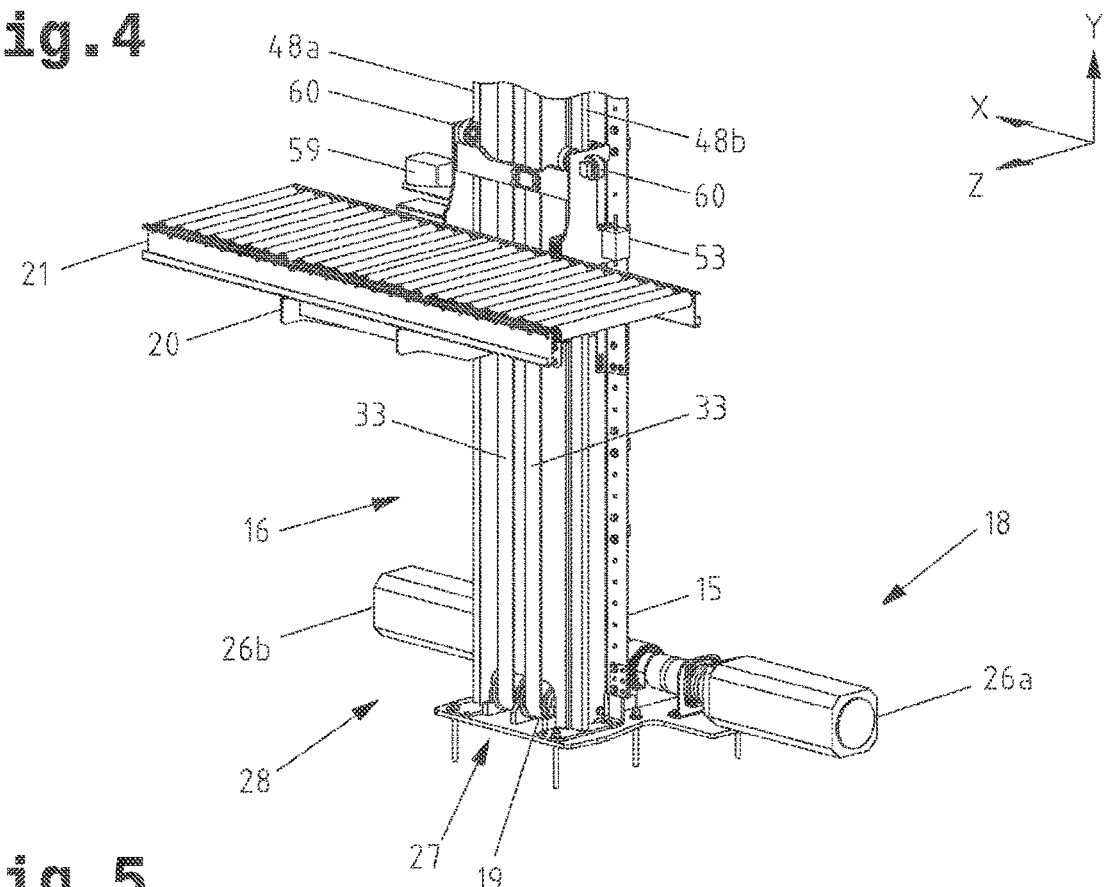
FIG. 4 a detailed, oblique view from a rear position onto a loading good lifting device of the loading good manipulation unit according to FIG. 1.
Figure 5:
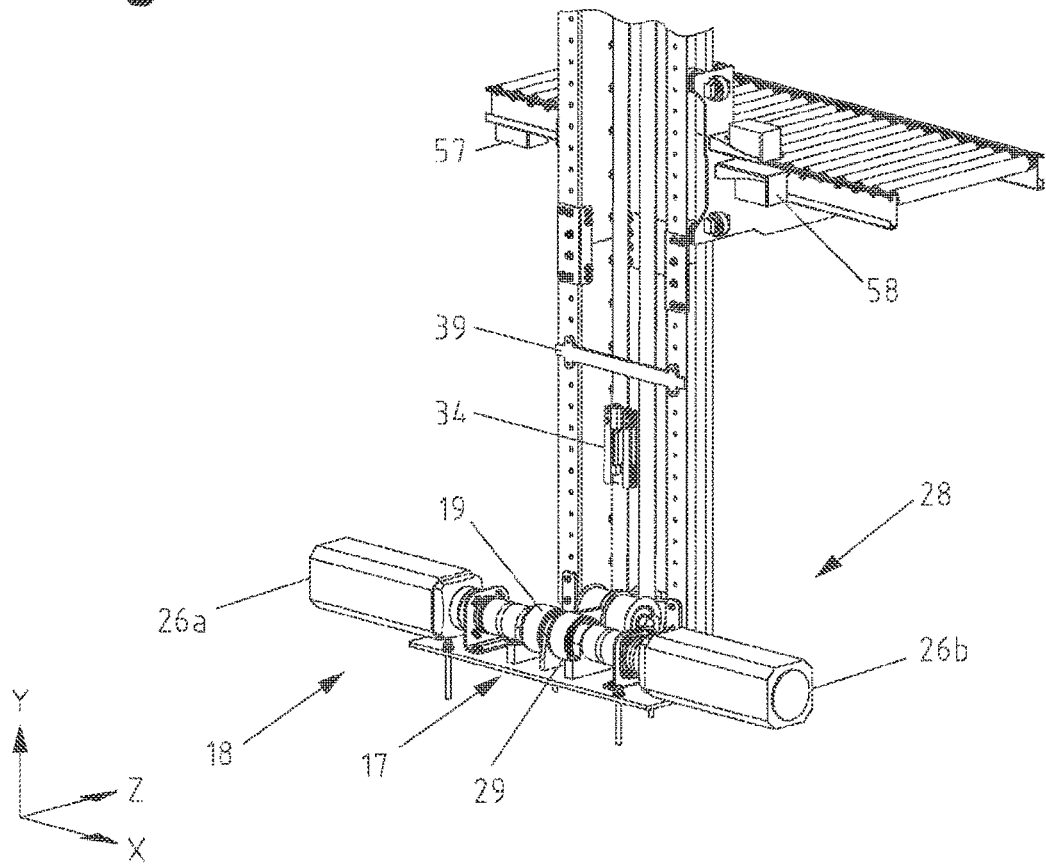
FIG. 5 like FIG. 4, but from a front position.

In addition to this, FIGS. 4 and 5 show a detailed oblique view of the loading good lifting device 13a used in the rack storage system 1 according to FIG. 1; FIG. 4 from a rear position, FIG. 5 from a front position. The loading good lifting device 13b additionally used in the rack storage system 1 according to FIG. 1 is identical, in terms of constructive design and function, with the loading good lifting device 13a.

The traction means 33, which is configured as a toothed belt in this specific example, and the tensioning mechanism 34, which connects the two ends of the traction means 33, can be readily seen in FIGS. 4, 5, 12 and 14. The traction means 33 to which the lifting frame 20 is connected (movement-coupled) is guided via a drive wheel 35 coupled to the drive motor 26a, a bottom deflection wheel 36, a top deflection wheel 37 and a guide wheel 38. Further, in particular connection struts 39 for the vertical mast 15 can be seen in FIG. 5. The traction means 33 to which the (optional) additional lifting frame 30 is connected (movement-coupled) is guided via a drive wheel 35 coupled to the drive motor 26b, a bottom deflection wheel 36, a top deflection wheel 37 and a guide wheel 38.

FIG. 6 shows a horizontal section through the vertical mast 15. The vertical mast 15 has an open profile cross section in this example. The profile cross section comprises a profile base 40, profile legs 41 protruding from same (and extending in parallel) and mounting legs 42 angled off the free ends of the profile legs 41 on which the vertical mast 15 is affixed to the first storage rack 2a. The profile cross section is therefore U-shaped with mounting legs 42 bent outward, in this case. Yet it would also be conceivable that the profile cross section is C-shaped (with mounting legs 42 bent inward).

The open construction ensures that the fittings on the vertical mast 15 are easily accessible, whereby not only the production of the loading good manipulation unit 11 but also its maintenance is simplified. The mounting legs 42 are directed outward, and specifically bent about a vertical axis of the vertical mast 15, and offer a supporting surface for the mounting of the vertical mast on the first storage rack 2a.

Figure 8:
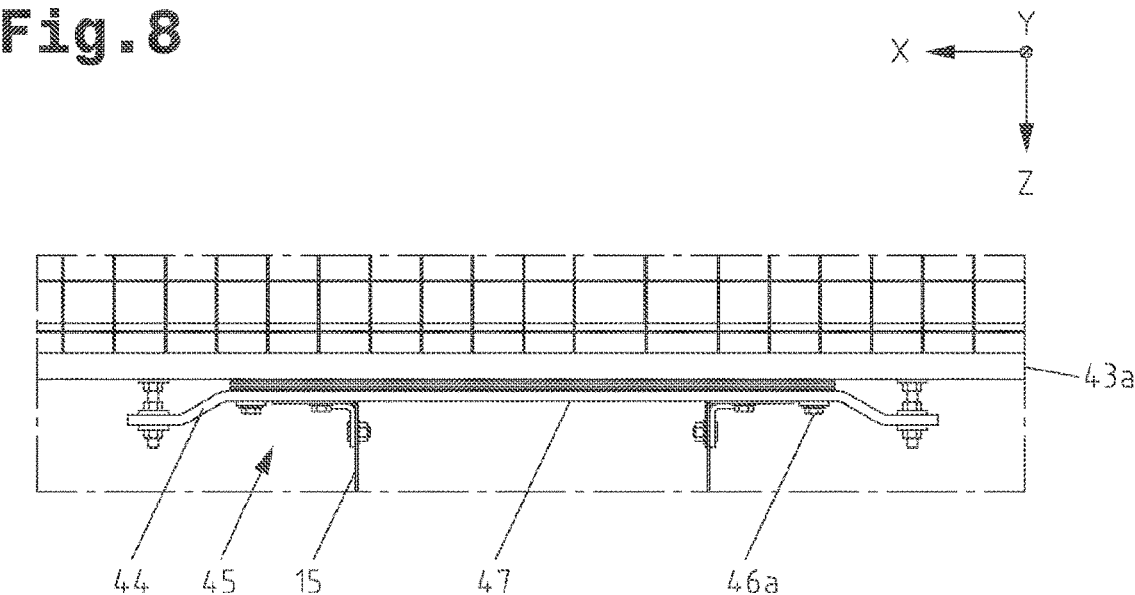
FIG. 8 an enlarged detail from FIG. 7 in a top view.

A particularly advantageous connection of the vertical mast 15 to the first storage rack 2a is depicted in FIGS. 7 and 8. FIG. 7 shows an oblique detail view of the rack storage system 1 in the region of the connection of the vertical mast 15 to the first storage rack 2a, FIG. 8 a top view.

Specifically, the first storage rack 2a comprises mounting beams 43a which are affixed to the front uprights 6a in addition to the front longitudinal beams 8a and extend parallel to the front longitudinal beams 8a. The second storage rack 2b comprises mounting beams 43b which are affixed to the front uprights 6b in addition to the front longitudinal beams 8b and extend parallel to the front longitudinal beams 8b. In this context, FIG. 9 shows a detail view onto a front upright 6a, a longitudinal beam 8a and a mounting beam 43a of the rack storage system 1.

The vertical mast 15 of the loading good lifting device 13a has a mounting section 45 facing the rack aisle 5 with which the first loading good lifting device 13a is mounted on the mounting beams 43a. The vertical mast 15 of the loading good lifting device 13b, if the loading good lifting device 13b is provided, has a mounting section 45 facing the rack aisle 5 with which the second loading good lifting device 13b is mounted on the mounting beams 43b.

Specifically, the connection between the vertical mast 15 and the mounting beams 43a (43a, 43b) is made by means of cranked (i.e. doubly bent) fastening elements 44. Alternatively, also single-bent fastening elements 44 could be used.

In particular, the vertical mast 15 is connected to the storage rack 2a, in particular to the mounting beams 43a (43a, 43b), via connection means 46a. Screws are provided as connection means 46a in the example shown. Yet also a connection by rivets or by clamps is conceivable. The affixing of the vertical mast 15 on the storage rack 2a (2a, 2b), in particular on multiple mounting sections 45 located vertically on top of one another, ensures that the vertical mast 15 is exceptionally stable, in particular against distortion, despite the open construction, even for mast heights of 30 to 40 m. Furthermore, it is of advantage that the use of material is low and also the weight is reduced to a minimum. This enables a simpler mounting with a lower technical complexity, and also the transport costs are low. The stability of the vertical mast 15 is even further increased by the connection struts 39.

Even though the open construction of the vertical mast 15 is of advantage, it would generally also be conceivable that the vertical mast 15 has a closed profile cross section and is in particular configured as a rectangular tube. In this case, the vertical mast 15 has a particularly high distortional stiffness.

In this example, the vertical mast 15 of the loading good lifting device 13a (or the vertical masts 15 of the first/second loading good lifting device 13a, 13b) is not, as is customary, connected to the front longitudinal beams 8a but to the separately provided mounting beams 43a (43a, 43b). This ensures that the lifting frame 20 can be adjusted on the vertical mast 15 in a highly dynamic manner, without a significant transmission of oscillations to the front longitudinal beams 8a, and thus to the guide rails for the storage and retrieval unit 23 and the storage locations 3 (the term "highly dynamic" in the given context means in particular speeds of >6 m/s and accelerations of >7 m/s$^2$). In particular, an undesired movement or "wandering" of the loading goods 4 deposited on the storage locations 3 such as it can occur in the prior art and may cause problems when retrieving the loading goods 4 can thus be avoided or at least reduced.

The bent and/or cranked construction of the fastening elements 44 additionally allows, on the one hand, a solid and very simple mounting of the vertical mast 15 on a mounting beam 43a, and, on the other hand, also a further reduction of the transmission of oscillations between the loading good lifting device 13a (or the first/second loading good lifting device 13a, 13b) and the loading goods 4. Specifically, the fastening element 44 can essentially act as a bending spring. When selecting the material for the fastening element 44, it should be ensured that the material has sufficient dampening properties to prevent undesired resonance phenomena. In particular, it is of advantage if the fastening element 44 is manufactured from a material with an elastic modulus of less than 40,000 MPa. The small elastic modulus ensures that the risk of a transmission of oscillations between the loading good lifting device 13a (or the first/second loading good lifting device 13a, 13b) and the loading goods 4 is reduced to a particularly large extent.

It should generally be noted that the bending spring effect is not bound to a bent or cranked construction of the fastening element 44. Rather, a free bending length between the connecting point of the vertical mast 15 on the fastening element 44 and the connecting point of the mounting beam 43a (43a, 43b) on the fastening element 44 is authoritative.

It can be seen in FIG. 8 that, for the perpendicular alignment of the vertical mast 15 and/or for equalizing the distance between the vertical mast 15 and the mounting beams 43a, distance plates 47 can be inserted between the vertical mast 15 and the mounting beams 43a (43a, 43b) in different numbers and/or different strengths. It is advantageous if also the distance plates 47 are manufactured from a material with an elastic modulus of less than 40,000 MPa.

Thus, in particular plastics, such as Teflon or fiber reinforced plastic, for example, are suitable as material for the fastening elements 44 and/or the distance plates 47. Yet it is also conceivable to use rubber or wood (in particular plywood), which equally has excellent dampening properties. Evidently, also the use of other composite materials than fiber reinforced plastic is conceivable, for example plastic-wood compound materials.

Even though the distance plate 47 is preferably manufactured from a material with an elastic modulus of less than 40,000 MPa, it is generally conceivable for the distance plate 47 to be manufactured from a metal (in particular from steel). In this case, the distance plate 47 can be referred to as a "spacer sheet."

In this example, the vertical mast 15 is arranged offset laterally to the rack aisle 5 in the z direction z, i.e. outside of the rack aisle 5 on the rear side of the mounting beams 43a (43a, 43b). Yet it would also be conceivable for the vertical mast 15 to be arranged on the front side of the mounting beams 43a (43a, 43b), and thus inside the rack aisle 5, in its periphery.

The mounting beams 43a (43a, 43b) are suitable not only for connecting the vertical mast 15 to the storage rack 2a (2a, 2b) but also for mounting the walkways 32, which are arranged in the rack aisle 5 on maintenance levels E3 located on top of one another and affixed to the mounting beams 43a of the first storage rack 2a and to the mounting beams 43b of the second storage rack 2b. These measures ensure that assembly and/or maintenance levels E3 are provided in the rack storage system 1 which can be entered by assembly and/or maintenance staff in order to carry out assembly work and/or maintenance work in the rack storage system 1.

Again, screws, rivets or clamps can be provided as connection means 46b (see FIG. 7) between the walkways 32 and the mounting beams 43a.

It is further readily apparent from FIG. 6 that the first lifting guide 16 for guiding the first lifting frame 20 (and for guiding the additional lifting frame 30, if provided), in this example, comprises a first guide rail 48a and a second guide rail 48b which extend separately and in parallel in a longitudinal direction of the vertical mast 15 and are preferably releasably connected to the vertical mast 15 via connection means 46c. In particular, the first guide rail 48a and the second guide rail 48b are formed by bright-drawn or ground, flat rolled steel which has tapped holes for affixing same to the vertical mast 15. Despite an inexpensive and modular construction, the lifting frame 20 on the first lifting guide 16 runs steadily, and only small vibrations are discharged into in the vertical mast 15.

It is also of advantage if the vertical mast 15 and the first lifting guide 16, as well as the front uprights 6a and rear uprights 7a of the first storage rack 2a, are produced from the same material, in particular from steel. The proposed measures ensure in particular that temperature-related tensions and/or play between the components of the rack storage system 1 can be avoided. This variant embodiment is therefore suitable in particular for rack storage systems 1 which are to be used in a broad temperature spectrum or are exposed to variations in temperature. This applies to rack storage systems 1, for example, which are erected at ambient temperature but are then operated at very low temperatures, such as this is the case for deep-freeze stores, for example. Generally, the temperature range in which rack storage systems 1 are used is about −40° C. to +40° C. By avoiding play between the components, in particular the noise emission during operation of the loading good lifting device 13a (or the first/second loading good lifting device 13a, 13b) and the storage and retrieval units 23 can be reduced.

It is also of advantage in the above context if the front longitudinal beams 8a, as well as the rear longitudinal beams 9a and/or the mounting beams 43a, are additionally produced from the same material as the vertical mast 15, the first lifting guide 16 and the front and rear uprights 6a, 7a. This ensures that temperature-related tensions and/or play between the components of the rack storage system 1 can be avoided even more efficiently.

Figure 10:
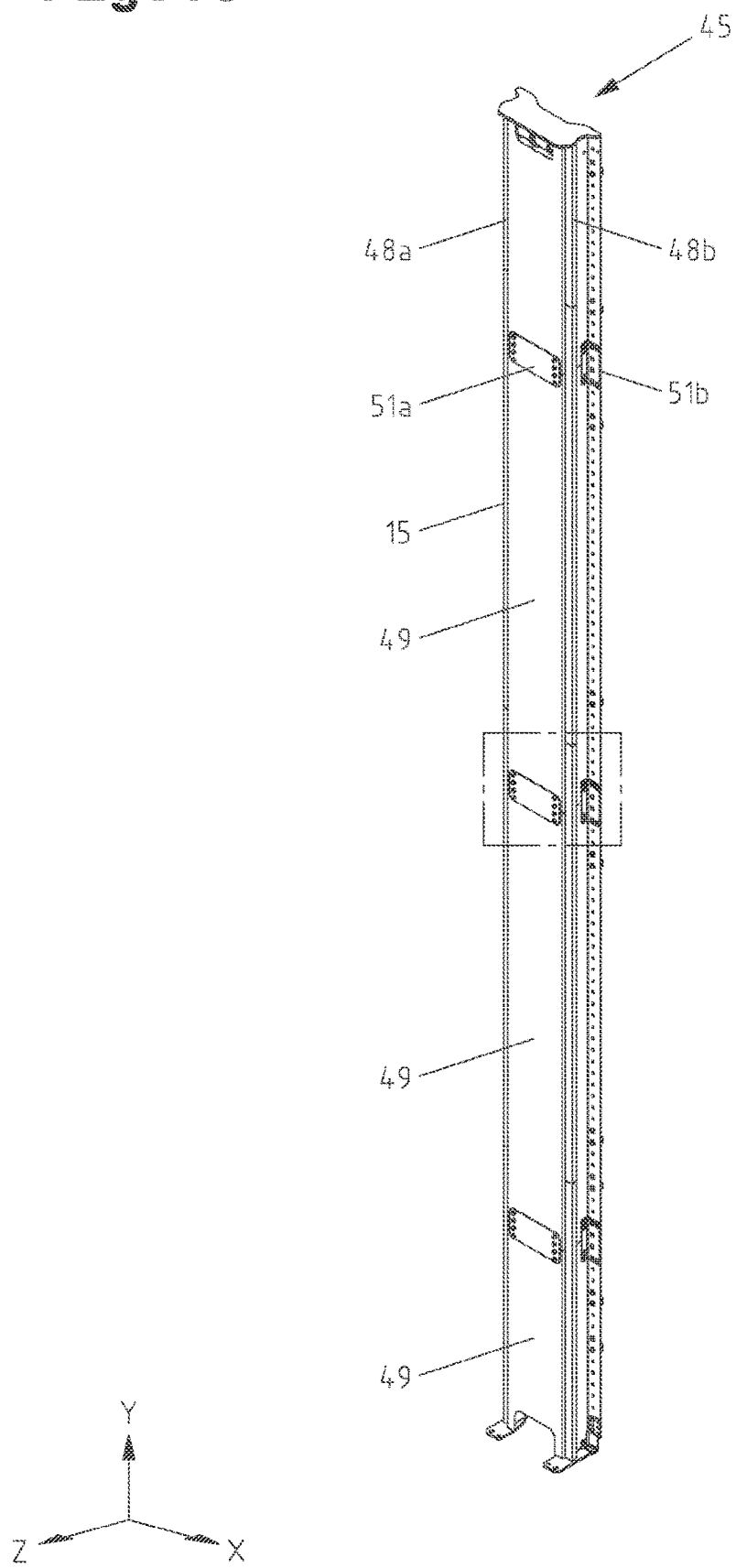
FIG. 10 a vertical mast of a loading good lifting device in an oblique view.
Figure 11:
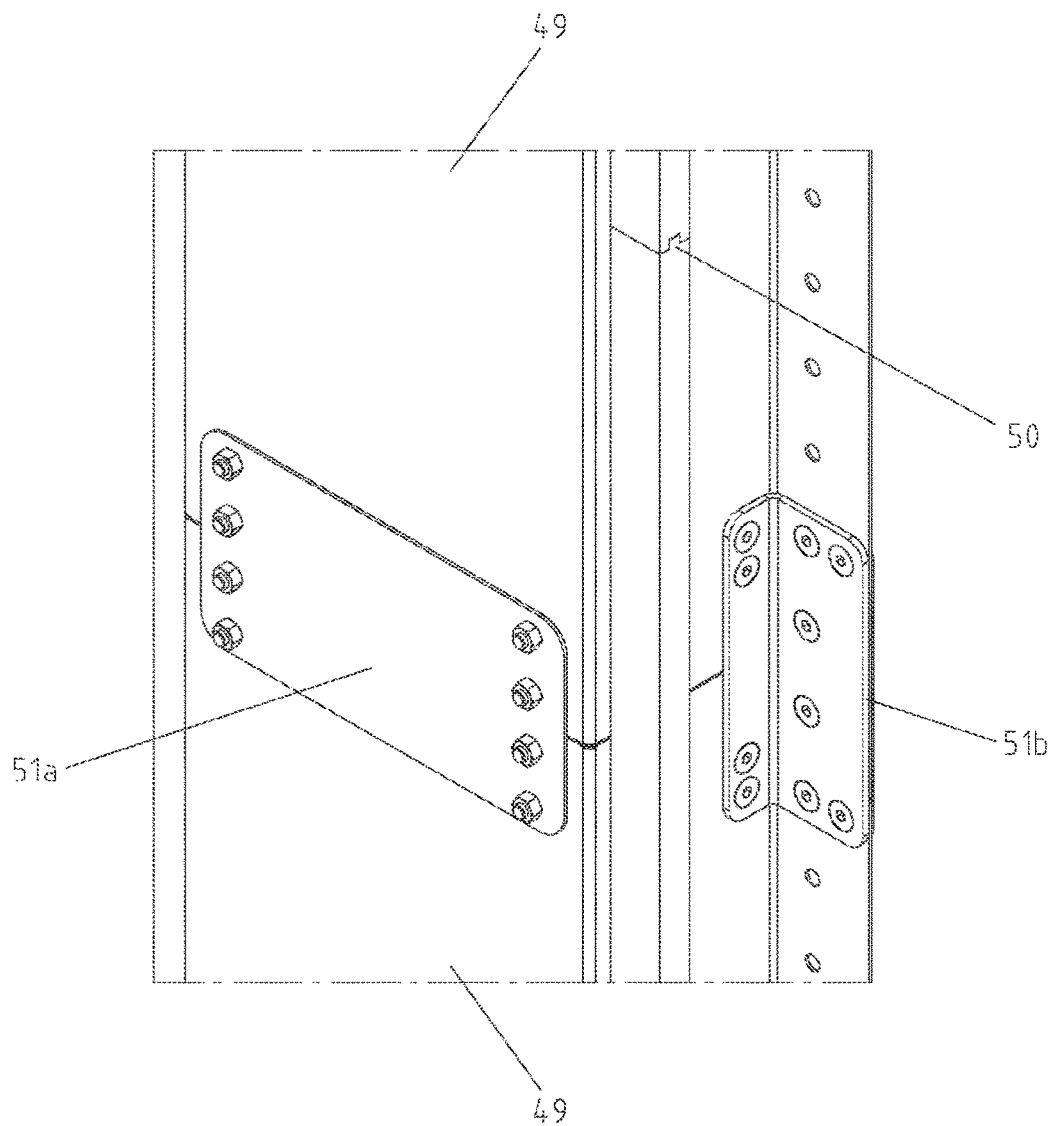
FIG. 11 a detail view of the vertical mast from FIG. 10.
Figure 12:
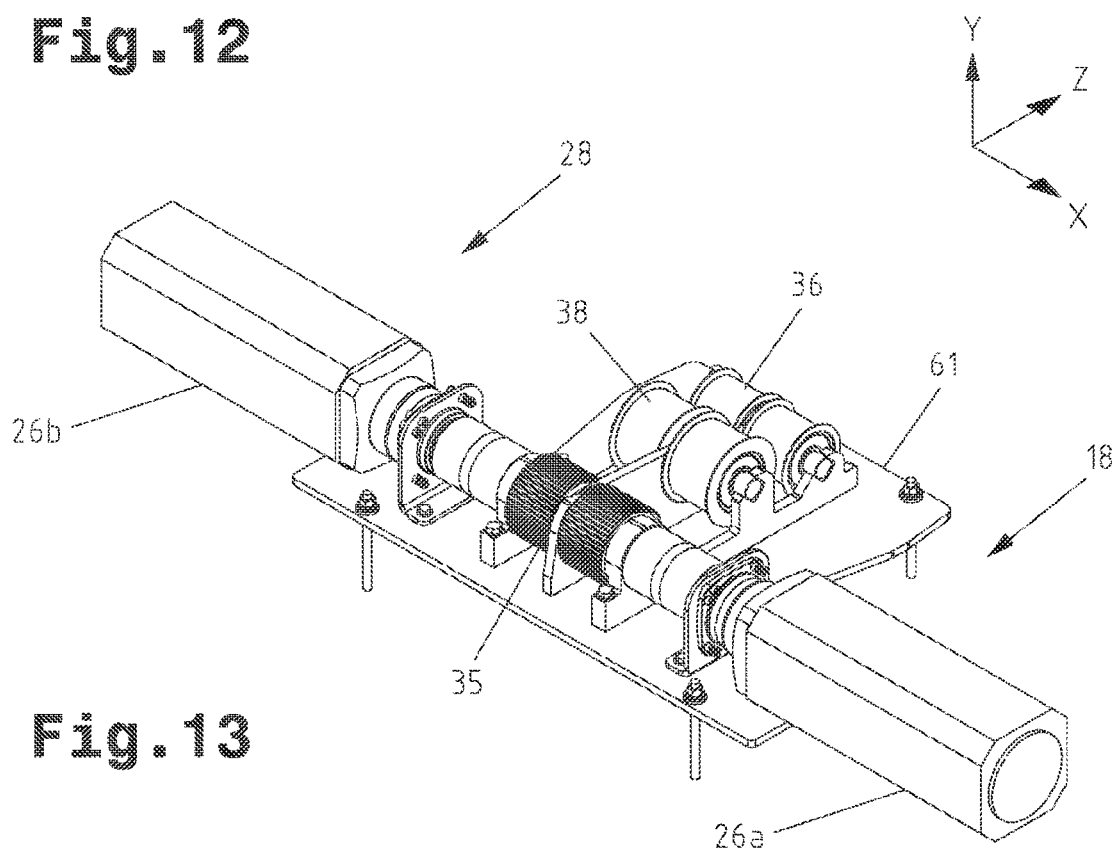
FIG. 12 a detail view of the drive station used in the rack storage system according to FIG. 1 in an oblique view.

In the example shown, the vertical mast 15 advantageously has a plurality of mast segments 49 which are jointed vertically on top of one another in an essentially gap-free manner, as depicted in FIG. 10. In addition, the first lifting guide 16 for guiding the first lifting frame 20 is advantageously subdivided in a vertical direction by complementary-shape butt joints 50. In particular, a division between the mast segments 49 can be arranged offset in a vertical direction to the butt joints 50 of the lifting guide 16, such as it is the case in the pre-sent example. In this context, FIG. 11 shows the vertical mast 15 used in the rack storage system 1 in an oblique view, and FIG. 12 shows a detail view of the vertical mast 15.

The proposed measures ensure that, on the one hand, the transport of the vertical mast 15 and its placement into the building on the erection site is facilitated, on the other hand, the division of same enables a modular structure of the loading good lifting device 13a. Specifically, depending on the stipulated lifting height, different numbers of mast segments 49 can be assembled to form a vertical mast 15. The mast segments 49 are preferably screwed to one another, for example using connecting plates 51a, 51b.

As the butt joint of the lifting guide 16 is not arranged at the same height level as a division between two mast segments 49, an (undesired) shifting of mast segments 49 in relation to one another, such as it can occur by tensions of the mast segments 49 in relation to one another, for example, has no, or only a minor, effect on the butt joints 50 (see FIG. 11) of the lifting guides 16. This ensures that the occurrence of vibrations and/or oscillations during the movement of the lifting frame 20 can be kept low. Further, a bending stress which is discharged into the lifting guides 16 on the vertical mast 15 by the lifting frame 20 is guided over and beyond the joint of the mast elements 49.

Advantageously, the loading good manipulation unit 11 comprises an energy-absorbing deformation means 52 which is fixedly mounted below the first lifting frame 20, in particular on a side of the vertical mast 15 facing away from the rack aisle 5 (for example on a fixed component of the loading good manipulation unit 11 or directly on a floor of the rack storage system 1), such as it is apparent in FIGS. 1, 2 and 14.

Figure 14:
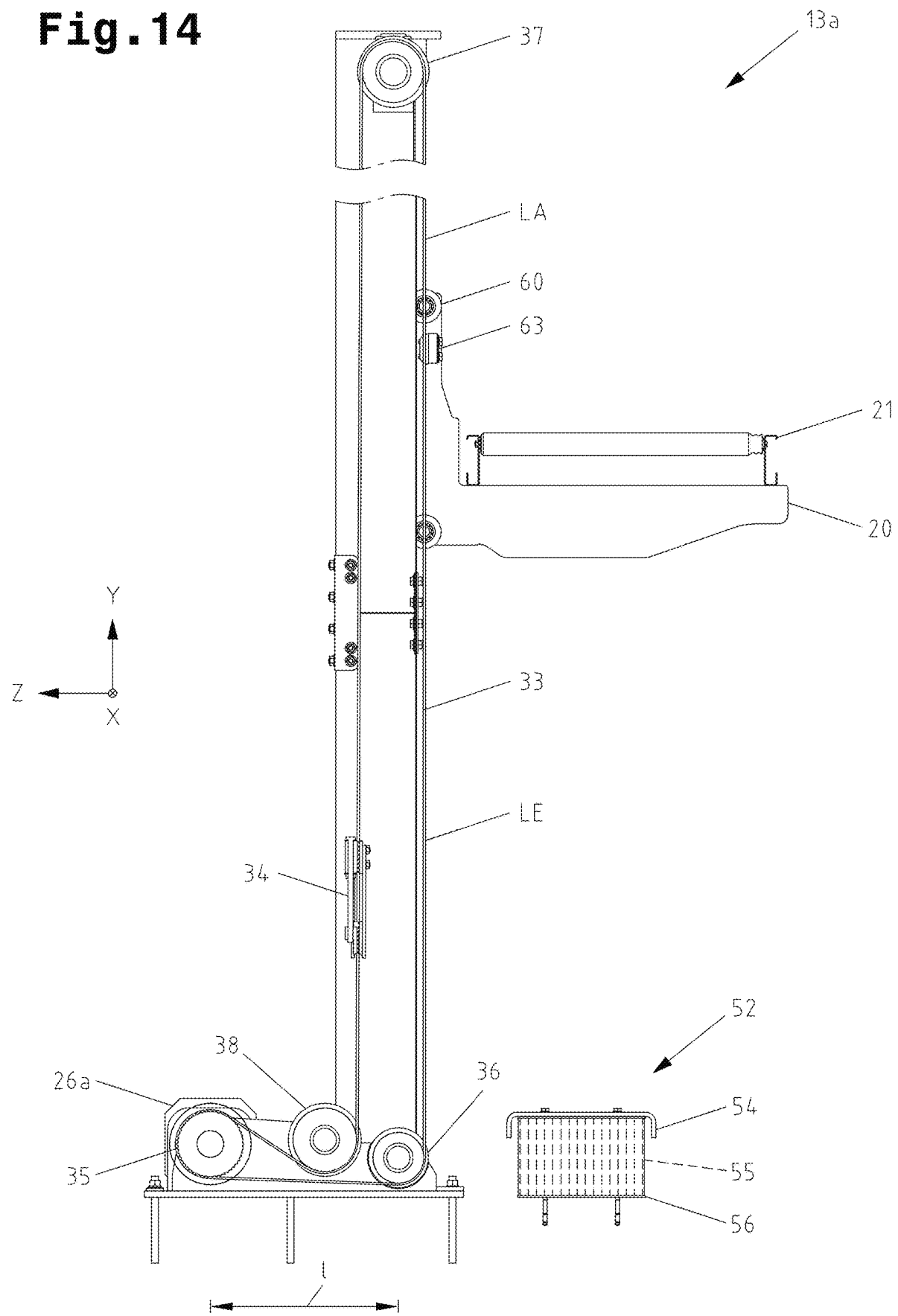

In this context, FIGS. 2 and 14 show a detail view of the deformation means 52 used on the loading good manipulation unit 11 and arranged below the lifting frame 20.

With the help of the deformation means 52, damage to the loading good manipulation unit 11 can be kept small if the traction means drive 19 should fail (for example because a traction means 33 of the traction means drive 19 ruptures) and the lifting frame 20 is not assigned a safety brake 53, or a safety brake 53 for the lifting frame 20 should not respond rapidly enough. If, upon the failure of the traction means drive 19, the lifting frame 20 is located below the height which corresponds to the delay time or brake engagement time of the safety brake 53, the safety brake 53 is completely ineffective. In case the lifting frame 20 is moving downward at its maximum speed upon the rupturing of the traction means 33, the problem becomes even more apparent. With the help of the deformation means 52, the impact of the lifting frame 20 can nevertheless be dampened. Advantageously, a deformation means 52 generally has a lower overall height than hydraulic dampers, for example. In normal operation, the lifting frame 20 can therefore be moved further downward than it would be the case when using hydraulic dampers, for example.

In the example shown, the energy-absorbing deformation means 52 comprises a force distribution plate 54 (see FIG. 14) having an impact area for the first lifting frame 20, a honeycomb element 55 below the force distribution plate 54 which is plastically deformable by use application of force and which at least partially absorbs an impact energy generated in case of a collision of the first lifting frame 20 with the force distribution plate 54, and a mounting plate 56 below the honeycomb element for mounting the deformation means 52.

Advantageously, the hollows of the honeycomb element 55 extend in a vertical direction. The honeycomb structure enables a favorable stiffness-to-volume ratio and/or a favorable stiffness-to-weight ratio. This means that the deformation means 52 is small and/or light despite a high energy absorption during the deformation. This ensures that a deformation means 52 with only a short overall height can be provisioned, which enables the movement of the lifting frame 20 to just above floor level. In addition, the compression behavior of the deformation means 52 is easily influenced due to the honeycomb structure. Finally, this also enables low production and replacement costs.

The force distribution plate 54 ensures that the forces occurring upon the impact of the lifting frame 20 are evenly discharged into the honeycomb element 55 arranged below it, and the honeycomb element 55 is deformed evenly. This also applies whenever the lifting frame 20 has only a small surface in a vertical projection and/or the contact area between the lifting frame 20 and the deformation means 52 is only small. Preferably, the force distribution plate 54 is connected, in particular glued, to the honeycomb element 55. Preferably, also the mounting plate 56 is connected, in particular glued, to the honeycomb element 55.

Advantageously, the bending stiffness of the force distribution plate 54 about a horizontal axis is at least twice as strong as the compression stiffness of the honeycomb element 55 in a vertical direction. It is also favorable if a difference of the vertical deformation of the honeycomb element 55 is a maximum of 10% of the overall height of the intact honeycomb element 55 if the maximum deformation is 75% of the overall height of the intact honeycomb element 55. In other words, the smallest deformation is then 65% of the overall height of the intact honeycomb element 55. In other words, the honeycomb element 55 should give in and deform before the force distribution plate 54 deforms significantly.

It should be noted in this context that it would generally also be possible to arrange the force distribution plate 54 on the lifting frame 20. In order to keep the moving mass of the lifting frame 20 small, however, it is of advantage to mount the force distribution plate 54 permanently on the honeycomb element 55. This ensures that the lifting frame 20 can be produced using lightweight construction.

Also an acceleration sensor 57 for detecting at least one acceleration in a vertical direction can be arranged on the first lifting frame 20 (see FIG. 5). In FIGS. 4 and 5, also an optical distance-measuring sensor 58 for detecting the vertical position of the first lifting frame 20 and an optical data transceiver 59 (note also the counterpart arranged on the floor) for the optical data transmission to or from the first lifting frame 20 are shown. The loading good lifting device 13a (or the first/second loading good lifting device 13a, 13b), in this example, comprises the optical distance-measuring sensor 58 and/or the optical data transceiver 59.

With the help of the acceleration sensor 57, in particular an excessive vertical acceleration such as it occurs during the undesired falling of the lifting frame 20 can be detected. Countermeasures, such as the activation of a safety brake 53, for example, can then be initialized. It is further conceivable that the acceleration sensor 57 is used for detecting undesired and/or unexpected vibrations and oscillations such as they can occur, for example, in case of a fault of the loading good lifting device 13a (such as a broken bearing on a guide roller 60 of the lifting frame 20). Generally, the detection of an excessive vertical acceleration is not bound to the use of an acceleration sensor 57, but also the optical distance-measuring sensor 58 can, of course, be used for this purpose, namely by calculating the time differential of its position signal.

In particular also the combination and/or integration of an optical distance-measuring sensor 58 and the optical data transmission in a single device is conceivable. The structure of the loading good lifting device 13a is then therefore particularly compact.

FIG. 12 shows an oblique detail view of the drive station 18 used in the rack storage system 1 and of the optional additional drive station 28.

It can be readily seen that the drive station 18 of the first lifting drive 17 and the additional drive station 28 of the first additional lifting drive 27 are arranged on a common base plate 61. This enables a modular structure of the loading good manipulation unit 11. Depending on the stipulated storage capacity and/or retrieval capacity of the loading good manipulation unit 11, one drive motor 26a is arranged on the base plate 61 or multiple drive motors 26a, 26b are arranged on the common base plate 61. The base plate 61 may comprise (non-depicted) means for aligning/positioning the vertical mast 15 to be erected thereupon and/or the bearings for the drive wheel 35, the bottom deflection wheel 36, the guide wheel 38, etc. These means can be formed by recesses (for example bores), depressions and/or elevations, for example. Effortful alignment measures are therefore not required.

In the example shown, the first vertical mast 15 is arranged on the base plate 61. If the base plate 61, such as it is the case in the example shown, has means for aligning the components arranged thereupon (i.e., for example, the vertical mast 15 and the first lifting drive 17, etc.) with one another, the first lifting drive 17 and the first vertical mast 15 can be "automatically" aligned in relation to each other during the mounting of the loading good lifting device 13a. Effortful measures for aligning the components with one another are therefore not required. It is particularly advantageous if the base plate 61 is aligned (leveled) and mounted on an installation surface in a first step before the vertical mast 15 is placed upon the base plate 61 from above and affixed to it in a second step. This ensures a perpendicular alignment of the vertical mast 15 (in particular of the bottommost mast segment 49). This simplifies the mounting of the loading good lifting device 13a (or the first/second loading good lifting device 13a, 13b).

Finally, also the energy-absorbing deformation means 52 can be arranged on the common base plate 61, whereby the mounting of the loading good manipulation unit 11 is simplified even further, in particular if the base plate 61, again, has means for aligning the deformation means 52 arranged thereupon.

Figure 13:
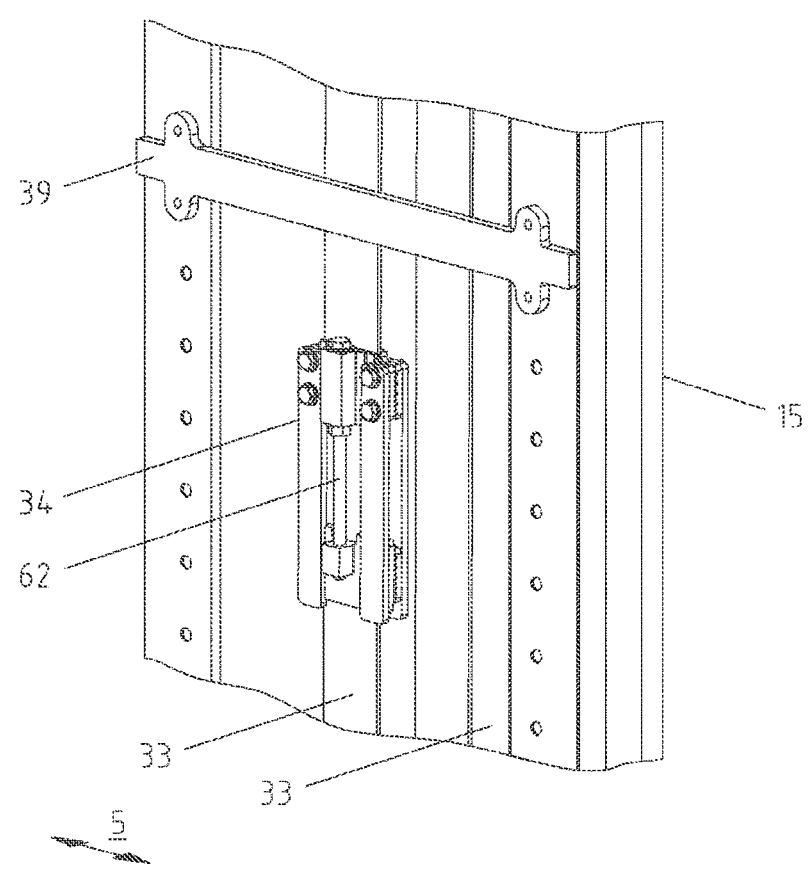
FIG. 13 a detail view of the tensioning mechanism for the traction means used in the rack storage system according to FIG. 1, and FIG. 14 a schematic side view of the loading good lifting device looking onto the guide of the traction means.

FIG. 13 shows a detail view of the tensioning mechanism 34 for the traction means 33 used in the rack storage system 1, and FIG. 14 finally shows a schematic side view of the loading good manipulation unit 11 looking onto the energy-absorbing deformation means 52 and the loading good lifting device 13a with the traction means 33 guided along it.

The traction means drive is preferably mounted after affixing the vertical mast 15 to the base plate 61 and/or after affixing the vertical mast 15 to the storage rack 2a (2a, 2b). In the example shown, the traction means 33 is guided around the drive wheel 35, the top deflection wheel 37 mounted in the head region of the mast, the bottom deflection wheel 36 mounted in the base region of the mast, and around the guide wheel 38. In this example, the guide wheel 38 is arranged in the region of the base of the vertical mast between the bottom deflection wheel 36 and the drive wheel 35. The ends of the traction means 33 can be interconnected via the tensioning mechanism 34, whereby an endless traction means 33 is formed. Furthermore, the tensioning mechanism 34 can be used to set a tensioning force (pretension) in the traction means 33. Specifically, in the example shown, this is done via a tensioning screw 62. The traction means 33 may in particular be configured as a toothed belt, and the drive wheel 35 as a toothed disk.

The proposed measures ensure that the driving force and/or the driving power of the drive motor 26a can be transmitted to the lifting frame 20 for only small moving masses. Also, the drive motor 26a can be installed permanently close to the floor and does not add to the moving mass of the lifting frame 20. In particular if the vertical mast 15 has an open profile cross section or is configured as a hollow profile, a first side of the traction means 33 can be guided along the inside of the mast 15 and a second side of the traction means 33 can be guided along the outside of the mast 15.

Due to the special configuration, the tensioning mechanism 34 is easily accessible from the rack aisle 5 (as schematically indicated by the double arrow in FIG. 13), whereby the tensioning of the traction means 33 during the production of the rack storage system 1, or a retensioning of the traction means 33 during the maintenance of the rack storage system 1, are possible in a simple manner.

It can be seen in FIG. 14 that the lifting frame 20 is coupled to the traction means 33 via a clamp 63. In addition, the clamp 63 divides the traction means 33 into a tight side LA, which designates the section of the traction means 33 located between the clamp 63 and the drive wheel 35 and guided via the top deflection wheel 37, and into a slack side LE, which designates the remaining section of the traction means 33 located between the clamp 63 and the drive wheel 35.

In the unstressed state (i.e. without the lifting frame 20), the tight side LA and the slack side LE are under the pretension, which is applied to the traction means 33 with the help of the tensioning mechanism 34. If the lifting frame 20 is coupled to the traction means 33 via the clamp 63 and is elevated, in addition to said pretension on the tight side LA which is applied to the traction means 33 with the help of the tensioning mechanism 34, there is a stress tension proportion influenced by the weight of the lifting frame 20 and the load (loading good/loading goods) located on it. This stress tension proportion expands the tight side LA in comparison to the unstressed state. This expansion is absorbed by the slack side LE, which is then shortened in comparison to the unstressed state. Accordingly, the tension acting on the slack side LE is reduced to a level below the pretension in the unstressed state. To prevent the traction means 33 from popping out of the bottom deflection wheel 36 and/or from slipping over the drive wheel 35 in the region of the slack side LE, the pretension on the slack side LE should not go down to zero also in this stress state, as the traction means will otherwise go slack. Such a state must be prevented in particular whenever the lifting frame 20 is accelerated upward and the tight side LA is expanded even more due to the increased stress tension proportion.

The positioning of the drive wheel 35 in the rack aisle 5 ensures that the slack side LE is considerably extended compared to a solution in which the drive wheel 35 for the traction means 33 is arranged in the base region of the mast (and then takes the place of the bottom deflection wheel 36). The length of the slack side LE can be approximately doubled compared to these known solutions, whereby the slack side LE can more easily absorb the expansion occurring on the tight side LA under stress and/or upon acceleration of the lifting frame 20. The pretension in the traction means 33 can therefore be selected relatively low, without a risk of the traction means 33 popping out of the bottom deflection wheel 36 or of the traction means 33 slipping through over the drive wheel 35. Accordingly, the usable stress tension proportion is comparatively high, and only relatively small cross sections are required for the traction means 33 to be able to carry and move the stipulated loading goods. The provision of the guide wheel 38 additionally widens the wrap angle around the drive wheel 35, which additionally improves the lifting drive 17.

Preferably, a center-to-center distance 1 (in particular a horizontal center-to-center distance) between the drive wheel 35 and the bottom deflection wheel 36 is at least 300 mm in order to achieve the above-mentioned objectives. Even more preferably, the center-to-center distance 1 is between 350 mm and 800 mm.

Finally, possible different embodiments of the loading good manipulation unit 11 will be ad-dressed below.

According to a non-depicted embodiment, the loading good manipulation unit 11 comprises exclusively a first buffer device 12a offset laterally to the rack aisle 5 in the z direction z and exclusively a first loading good lifting device 13a for storing and/or retrieving loading goods 4, in particular arranged in the periphery of the rack aisle 5. The (only) loading good lifting device 13a, therefore, serves the storage and retrieval of loading goods 4.

According to a first embodiment, the (only) buffer device 12a comprises provisioning devices 14 on at least some of the storage levels E1, which are respectively configured for buffering a loading good 4 or multiple loading goods 4 and are arranged adjacent in the x direction x on one of the sides of the first loading good lifting device 13a. Optionally, provisioning devices 14 can be provided on all storage levels E1. Some of the provisioning devices 14 serve the storage and some of the provisioning devices 14 serve the retrieval of loading goods 4, or the provisioning devices 14 can—in a reversing operation—respectively and as and when needed serve the storage or the retrieval of loading goods 4. As described above, the provisioning devices are either designed as passive provisioning devices or as active provisioning devices.

According to a second embodiment, the (only) buffer device 12a comprises provisioning devices 14 on at least some of the storage levels E1, which are respectively configured for buffering a loading good 4 or multiple loading goods 4 and are arranged adjacent in the x direction x at both sides of first loading good lifting device 13a. Optionally, provisioning devices 14 can be provided on all storage levels E1. The provisioning devices 14 which are arranged adjacent in the x direction x on the first side of the first loading good lifting device 13a then serve exclusively the storage of loading goods 4, and the provisioning devices 14 which are arranged adjacent in the x direction x on the second side of the first loading good lifting device 13a then serve exclusively the retrieval of loading goods 4. As described above, the provisioning devices are either designed as passive provisioning devices or active provisioning devices.

Different embodiments of this loading good manipulation unit 11 are described in WO 2013/090970 A2, FIG. 1 and WO 2016/033628 A1, FIG. 8, for example.

It should also be noted that the storage locations 3 arranged next to one another in an x direction on storage levels E1 located on top of one another are arranged either only on one of the sides of first/second loading good lifting device 13a, 13b, as apparent in FIGS. 1 and 3, or the storage locations 3 arranged next to one another in an x direction on storage levels (E1) located on top of one another are arranged both on a first side of the first/second loading good lifting device 13a, 13b and on a second side of the first/second loading good lifting device 13a, 13b (as depicted in WO 2016/033628 A1, FIG. 1, for example).

It should equally be noted that the loading good lifting device 13a and, if applicable, the loading good lifting device 13b (provided that the loading good manipulation unit 11 comprises a first loading good lifting device 13a and second loading good lifting device 13b) may also comprise merely the lifting frame 20 and the transport device 21. In this case, the additional drive station 28, the additional traction means drive 29, the additional lifting frame 30, and the additional transport device 31 will be redundant.

It should also be noted that the scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

In particular, it should also be noted the devices depicted may, in reality, also comprise more, or also fewer, components than depicted. In some cases, the shown devices and/or their components may not be depicted to scale and/or be enlarged and/or reduced in size.

LIST OF REFERENCE NUMBERS

| | |
|---|---|
| 1 | rack storage system |
| 2a, 2b | storage rack |
| 3 | storage location |
| 4 | loading good |
| 5 | rack aisle |
| 6a, 6b | front rack foot |
| 7a, 7b | rear rack foot |
| 8a, 8b | front longitudinal beam |
| 9a, 9b | rear longitudinal beam |
| 10a, 10b | shelf |
| 11 | loading good manipulation unit |
| 12a, 12b | buffer device |
| 13a, 13b | loading good lifting device |
| 14 | provisioning device |
| 15 | vertical mast |
| 16 | lifting guide |
| 17 | lifting drive |
| 18 | drive station |
| 19 | traction means drive |
| 20 | lifting frame |
| 21 | transport device |
| 22a, 22b | guide track |
| 23 | storage-and-retrieval unit |
| 24 | load suspension device |
| 25a, 25b | conveying device(s) |
| 26a, 26b | drive motor |
| 27 | additional lifting drive |
| 28 | additional drive station |
| 29 | additional traction means drive |
| 30 | additional lifting frame |
| 31 | additional transport device |
| 32 | walkway |
| 33 | traction means |
| 34 | tensioning mechanism |
| 35 | drive wheel |
| 36 | bottom deflection wheel |
| 37 | top deflection wheel |
| 38 | guide wheel |
| 39 | connection strut |
| 40 | profile base |
| 41 | profile legs |
| 42 | mounting legs |
| 43a, 43b | mounting beam |
| 44 | fastening element |
| 45 | mounting section |
| 46a . . . 46c | connection means |
| 47 | distance plate |
| 48a, 48b | guide rail |
| 49 | mast segment |
| 50 | butt joints |
| 51a, 51b | connecting plate |
| 52 | energy-absorbing deformation means |
| 53 | safety brake |
| 54 | force distribution plate |
| 55 | honeycomb element |
| 56 | mounting plate |
| 57 | acceleration sensor (in the housing of a control) |
| 58 | measuring sensor |
| 59 | optical data transceiver |
| 60 | guide roller |
| 61 | base plate |
| 62 | tensioning screw |
| 63 | clamp |
| A | drive axle |
| b | rack-to-rack distance / aisle width |
| E1 | storage level |
| E2 | travel plane |
| E3 | maintenance level |
| 1 | center-to-center distance drive wheel / bottom deflection wheel |
| LA | tight side of the traction means |
| LE | slack side of the traction means |
| x | x direction |
| y | y direction |
| z | z direction |

The invention claimed is:

1. A rack storage system, comprising
a first storage rack and a second storage rack facing each other at a distance in a horizontal z direction,
a rack aisle between the first storage rack and the second storage rack having a longitudinal axis extending horizontally in an x direction aligned orthogonally to the z direction,
the first storage rack having
storage locations for loading goods which are arranged next to one another on storage levels located on top of one another,
front uprights, rear uprights, front longitudinal beams per storage level extending in the x direction and connected to the front uprights, rear longitudinal beams per storage level extending in the x direction and connected to the rear uprights, and a shelf having the storage locations per storage level which is arranged between the front longitudinal beam and the rear longitudinal beam, the second storage rack having
    storage locations for loading goods which are arranged next to one another on storage levels located on top of one another,
    front uprights, rear uprights, front longitudinal beams per storage level extending in the x direction and connected to the front uprights, rear longitudinal beams per storage level extending in the x direction and connected to the rear uprights, and a shelf having the storage locations per storage level which is arranged between the front longitudinal beam and the rear longitudinal beam,
a loading good manipulation unit having a first buffer device offset laterally to the rack aisle in the z direction, and a first loading good lifting device for storing and/or retrieving loading goods arranged in the periphery of the rack aisle,
    the first buffer device having provisioning devices on at least some of the storage levels, which wherein the provisioning devices are respectively configured for buffering a loading good or multiple loading goods and are arranged adjacent in the x direction on one of the sides of the first loading good lifting device, or adjacent in the x direction at both sides of the first loading good lifting device, and
the first loading good lifting device, for storing and/or retrieving loading goods having
    a first vertical mast arranged in a periphery of the rack aisle, installed in a stationary manner, and affixed to the first storage rack,
    a first lifting drive with a drive station and a traction means drive, the first drive station being arranged on a side of the first vertical mast facing the rack aisle, and having a first drive motor arranged within the rack aisle,
    a first additional lifting drive with an additional drive station and an additional traction means drive, the additional drive station being arranged on a side of the first vertical mast facing the rack aisle, and having an additional drive motor arranged within the rack aisle,
    a first lifting frame supported on the first vertical mast and vertically movable using the first lifting drive, the first lifting frame being connected to the traction means drive of the first lifting drive,
    a first additional lifting frame supported on the first vertical mast and vertically movable using the first additional lifting drive, the first additional lifting frame being connected to the additional traction means drive of the first additional lifting drive,
    a first transport device arranged on the first lifting frame, which the first transport device being configured at least for transporting the loading goods between one of the provisioning devices and the first transport device in the x direction,
    wherein the first lifting frame with the first transport device is arranged on a side of the first vertical mast facing away from the rack aisle, and
    a first additional transport device arranged on the first additional lifting frame, the first additional transport device being configured at least for transporting the loading goods between one of the provisioning devices and the first additional transport device in the x direction,
    wherein the first additional lifting frame with the first additional transport device is arranged on a side of the first vertical mast facing away from the rack aisle,
guide tracks arranged respectively in pairs on the front longitudinal beams of the first storage rack and on the front longitudinal beams of the second storage rack in horizontal travel planes located on top of one another and extending in an x direction along the first storage rack, the second storage rack and the provisioning devices,
at least one automated storage and retrieval unit having at least one load handling device for transporting the loading goods between the storage locations and the provisioning devices, the at least one automated storage and retrieval unit being displaceable in the x direction along the guide tracks on a travel plane in front of the storage locations and in front of the provisioning device, and
a first conveying system for transporting loading goods to the first loading good lifting device and/or for transporting loading goods from the first loading good lifting device, the first conveying system being adjoined to the loading good manipulation unit,
    wherein the first loading good lifting device connects the first conveying system and the provisioning devices in terms of conveying.

2. The rack storage system according to claim 1, wherein the loading good manipulation unit further having a second buffer device offset laterally to the rack aisle in the z direction, and a second loading good lifting device for storing and/or retrieving loading goods arranged in the periphery of the rack aisle,
    the second loading good lifting device for storing and/or retrieving loading goods having
        a second vertical mast arranged in a periphery of the rack aisle, installed in a stationary manner, and affixed to the second storage rack,
        a second lifting drive with a drive station and a traction means drive, the drive station being arranged on a side of the second vertical mast facing the rack aisle, and having a drive motor arranged within the rack aisle,
        a second additional lifting drive with an additional drive station and an additional traction means drive, the additional drive station being arranged on a side of the second vertical mast facing the rack aisle, and having an additional drive motor arranged within the rack aisle,
        a second lifting frame supported on the second vertical mast and vertically movable using the second lifting drive, the second lifting frame being connected to the traction means drive of the second lifting drive,
        a second additional lifting frame supported on the second vertical mast and vertically movable using the second additional lifting drive, the second additional lifting frame being connected to the additional traction means drive of the second lifting drive,
        a second transport device arranged on the second lifting frame, the second transport device being configured at least for transporting the loading goods between one of the provisioning devices and the second transport device in the x direction,
        wherein the second lifting frame with the second transport device is arranged on a side of the second vertical mast facing away from the rack aisle, and a second additional transport device arranged on the second additional lifting frame, the second additional transport device being configured at least for transporting the loading goods between one of the provisioning devices and the second additional transport device in the x direction,
wherein the second additional lifting frame with the second additional transport device is arranged on a side of the second vertical mast facing away from the rack aisle.

3. The rack storage system according to claim 2, wherein a drive axle of the drive motor of at least one of the first lifting drive and the second lifting drive and a drive axle of the additional drive motor of at least one of the first additional lifting drive and the second additional lifting drive each is aligned in the x direction.

4. The rack storage system according to claim 2, wherein a drive axle of the drive motor of at least one of the first lifting drive and the second lifting drive and a drive axle of the additional drive motor of at least one of the first additional lifting drive and the second additional lifting drive each is aligned vertically.

5. The rack storage system according to claim 2, wherein the at least one of the first vertical mast and the second vertical mast having an open profile cross section,
the profile cross section comprising a profile base, profile legs protruding from the profile base, and mounting legs angled from the free ends of the profile legs on which the at least one of the first vertical mast and the second vertical mast is affixed to the at least one of the first storage rack and the second storage rack.

6. The rack storage system according to claim 2,
the first storage rack further having mounting beams affixed to the front uprights in addition to the front longitudinal beams and extending parallel to the front longitudinal beams, and
the first vertical mast having a mounting section facing the rack aisle, wherein the first loading good lifting device is supported on the mounting beams by the mounting section.

7. The rack storage system according to claim 6,
the second storage rack further having mounting beams affixed to the front uprights in addition to the front longitudinal beams and extending parallel to the front longitudinal beams, and
the second vertical mast having a mounting section facing the rack aisle, wherein the second loading good lifting device is supported on the mounting beams by the mounting section.

8. The rack storage system according to claim 7, further comprising walkways arranged in the rack aisle on maintenance levels located on top of one another and affixed to the mounting beams of the first storage rack and to the mounting beams of the second storage rack.

9. The rack storage system according to claim 7, wherein the connection between the at least one of the first vertical mast and the second vertical mast and one of the mounting beams of the one of the first storage rack and the second storage rack is made by a bent or cranked fastening element.

10. The rack storage system according to claim 9, wherein the bent or cranked fastening element and/or a distance plate arranged between the at least one of the first vertical mast and the second vertical mast and one of the mounting beams of the one of the first storage rack and the second storage rack is manufactured from a material with an elastic modulus of less than 40,000 MPa.

11. The rack storage system according to claim 2, the at least one of the first vertical mast and the second vertical mast having a plurality of mast segments which are jointed vertically on top of one another in an essentially gap-free manner.

12. The rack storage system according to claim 11, wherein the at least one of the first vertical mast and the second vertical mast comprises a lifting guide configured to guide the at least one of the first lifting frame and the first additional lifting frame, or the at least one of the second lifting frame and the second additional lifting frame, and subdivided in a vertical direction by complementary-shape butt joints.

13. The rack storage system according to claim 12, wherein a division between the mast segments is arranged offset in a vertical direction to the butt joints of the lifting guide of the at least one of the first vertical mast and the second vertical mast.

14. The rack storage system according to claim 2, wherein the at least one of the first vertical mast and the second vertical mast comprises a lifting guide configured to guide the at least one of the first lifting frame, the first additional lifting frame, the second lifting frame, and the second additional lifting frame and comprising a first guide rail and a second guide rail which extend separately and in parallel in a longitudinal direction of the at least one of the first vertical mast and the second vertical mast and are releasably connected to the at least one of the first vertical mast and the second vertical mast via connection means.

15. The rack storage system according to claim 2, wherein the first vertical mast, the second vertical mast, a lifting guide of the first vertical mast configured to guide the at least one of the first lifting frame and the first additional lifting frame, a lifting guide of the second vertical mast configured to guide the at least one of the second lifting frame and the second additional lifting frame, the front uprights and the rear uprights of the first storage rack, and the second storage rack are produced from the same material.

16. The rack storage system according to claim 2, wherein the loading good manipulation unit comprises an energy-absorbing deformation means which is fixedly mounted below the at least one of the first lifting frame and the second lifting frame.

17. The rack storage system according to claim 16, wherein the energy-absorbing deformation means comprising
a force distribution plate having an impact area for the at least one of the first lifting frame and the second lifting frame,
a honeycomb element below the force distribution plate which is plastically deformable by application of force and which at least partially absorbs an impact energy generated in case of a collision of the at least one of the first lifting frame and the second lifting frame with the force distribution plate, and
comprises a mounting plate below the honeycomb element for mounting the energy-absorbing deformation means.

18. The rack storage system according to claim 17, wherein hollows of the honeycomb element extend in a vertical direction.

19. The rack storage system according to claim 2, wherein the at least one of the first lifting drive and the first additional lifting drive and the first vertical mast are arranged on a first common base plate, and the at least one of the second lifting drive and the second additional lifting drive and the second vertical mast are arranged on a second common base plate.

20. The rack storage system according to claim 2, wherein the loading good manipulation unit comprises a first energy-absorbing deformation means which is fixedly mounted below the first lifting frame and a second energy-absorbing deformation means which is fixedly mounted below the second lifting frame,
the first lifting drive and the first energy-absorbing deformation means are arranged on a first common base plate, and
the second lifting drive and the second energy-absorbing deformation means are arranged on a second common base plate.

21. The rack storage system according to claim 2, wherein the drive station of the first lifting drive and the additional drive station of the first additional lifting drive are arranged on a first common base plate, and
the drive station of the second lifting drive and the additional drive station of the second additional lifting drive are arranged on a second common base plate.

22. The rack storage system according to claim 2, wherein an acceleration sensor for detecting at least one acceleration in a vertical direction is arranged on at least one of the first lifting frame and the second lifting frame, and/or
the at least one of the first loading good lifting device and the second loading good lifting device comprises an optical distance-measuring sensor for detecting the vertical position of the at least one of the first lifting frame and the second lifting frame, and/or
the at least one of the first loading good lifting device and the second loading good lifting device comprises means for the optical data transmission to or from the at least one of the first lifting frame and the second lifting frame.

23. The rack storage system according to claim 2, wherein the traction means drive of the at least one of the first lifting drive and the second lifting drive comprising a traction means, and
the at least one of the first loading good lifting device has and the second loading good lifting device having a tensioning mechanism for assembling the traction means and/or for setting a pretension force in the traction means, wherein the tensioning mechanism is arranged on the side of the at least one of the first vertical mast and the second vertical mast facing the rack aisle.

24. The rack storage system according to claim 2, wherein the rack storage system further comprising
a second conveying system for transporting loading goods to the second loading good lifting device and/or for transporting loading goods from the second loading good lifting device, the second conveying system being adjoined to the loading good manipulation unit.

25. The rack storage system according to claim 2, wherein the traction means drive of the at least one of the first lifting drive, the first additional lifting drive, the second lifting drive, and the second additional lifting drive each comprises a drive wheel, a bottom deflection wheel, a top deflection wheel, a guide wheel, and a traction means guided around the drive wheel, the bottom deflection wheel, the top deflection wheel, and the guide wheel,
the bottom deflection wheel is being arranged in the region of a base of the at least one of the first vertical mast and the second vertical mast and the top deflection wheel is arranged in the region of a head of the at least one of the first vertical mast and the second vertical mast,
the guide wheel being arranged in the region of the base of the at least one of the first vertical mast and the second vertical mast between the bottom deflection wheel and the drive wheel,
the drive wheel is being arranged at a distance to the at least one of the first vertical mast and the second vertical mast in the region of the base of the at least one of the first vertical mast and the second vertical mast, and
a center-to-center distance between the drive wheel and the bottom deflection wheel is at least 300 mm.

26. A rack storage system, comprising
a first storage rack and a second storage rack facing each other at a distance in a horizontal z direction,
a rack aisle between the first storage rack and the second storage rack having a longitudinal axis extending horizontally in an x direction aligned orthogonally to the z direction,
the first storage rack having
storage locations for loading goods which are arranged next to one another on storage levels located on top of one another,
front uprights, rear uprights, front longitudinal beams per storage level extending in the x direction and connected to the front uprights, rear longitudinal beams per storage level extending in the x direction and connected to the rear uprights, and a shelf having the storage locations per storage level which is arranged between the front longitudinal beam and the rear longitudinal beam,
the second storage rack having
storage locations for loading goods which are arranged next to one another on storage levels located on top of one another,
front uprights, rear uprights, front longitudinal beams per storage level extending in the x direction and connected to the front uprights, rear longitudinal beams per storage level extending in the x direction and connected to the rear uprights, and a shelf having the storage locations per storage level which is arranged between the front longitudinal beam and the rear longitudinal beam,
a loading good manipulation unit having a first buffer device offset laterally to the rack aisle in the z direction, and a first loading good lifting device for storing and/or retrieving loading goods,
the first buffer device having provisioning devices on at least some of the storage levels, wherein the provisioning devices are respectively configured for buffering a loading good or multiple loading goods and are arranged adjacent in the x direction on one of the sides of the first loading good lifting device, or adjacent in the x direction at both sides of the first loading good lifting device, and
the first loading good lifting device for storing and/or retrieving loading goods having
a first vertical mast installed in a stationary manner and having an open profile cross section,
the profile cross section comprising a profile base, profile legs protruding from the profile base, and mounting legs angled from the free ends of the profile legs on which the first vertical mast is affixed to the first storage rack, a first lifting drive with a drive station and a traction means drive, a first additional lifting drive with an additional drive station and an additional traction means drive, a first lifting frame supported on the first vertical mast and vertically movable using the first lifting drive, the first lifting frame being connected to the traction means drive of the first lifting drive, a first additional lifting frame supported on the first vertical mast and vertically movable using the first additional lifting drive, the first additional lifting frame being connected to the additional traction means drive of the first additional lifting drive, a first transport device arranged on the first lifting frame, the first transport device being configured at least for transporting the loading goods between one of the provisioning devices and the first transport device in the x direction, a first additional transport device arranged on the first additional lifting frame, the first additional transport device being configured at least for transporting the loading goods between one of the provisioning devices and the first additional transport device in the x direction, guide tracks arranged respectively in pairs on the front longitudinal beams of the first storage rack and on the front longitudinal beams of the second storage rack in horizontal travel planes located on top of one another and extending in an x direction along the first storage rack, the second storage rack and the provisioning devices, at least one automated storage and retrieval unit having at least one load handling device for transporting the loading goods between the storage locations and the provisioning devices, the at least one automated storage and retrieval unit being displaceable in the x direction along the guide tracks on a travel plane in front of the storage locations and in front of the provisioning device, and a first conveying system for transporting loading goods to the first loading good lifting device and/or for transporting loading goods from the first loading good lifting device, the first conveying device being adjoined to the loading good manipulation unit, wherein the first loading good lifting device connects the first conveying system and the provisioning devices in terms of conveying.

27. The rack storage system according to claim 26, wherein the loading good manipulation unit further having a second buffer device offset laterally to the rack aisle in the z direction, and a second loading good lifting device for storing and/or retrieving loading goods arranged in the periphery of the rack aisle, the second loading good lifting device for storing and/or retrieving loading goods having a second vertical mast arranged in a periphery of the rack aisle, installed in a stationary manner, and affixed to the second storage rack, a second lifting drive with a drive station and a traction means drive, the drive station being arranged on a side of the second vertical mast facing the rack aisle, and having a drive motor arranged within the rack aisle, a second additional lifting drive with an additional drive station and an additional traction means drive, the additional drive station being arranged on a side of the second vertical mast facing the rack aisle, and having an additional drive motor arranged within the rack aisle, a second lifting frame supported on the second vertical mast and vertically movable using the second lifting drive, the second lifting frame being connected to the traction means drive of the second additional lifting drive, a second additional lifting frame supported on the second vertical mast and vertically movable using the second additional lifting drive, the second additional lifting frame being connected to the additional traction means drive of the second additional lifting drive, a second transport device arranged on the second lifting frame, the second transport device being configured at least for transporting the loading goods between one of the provisioning devices and the second transport device in the x direction, wherein the second lifting frame with the second transport device is arranged on a side of the second vertical mast facing away from the rack aisle, and a second additional transport device arranged on the second additional lifting frame, the second additional transport device being configured at least for transporting the loading goods between one of the provisioning devices and the second additional transport device in the x direction, wherein the second additional lifting frame with the second additional transport device is arranged on a side of the second vertical mast facing away from the rack aisle.

28. The rack storage system according to claim 27, the first storage rack further having mounting beams affixed to the front uprights in addition to the front longitudinal beams and extending parallel to the front longitudinal beams, and the first vertical mast having a mounting section facing the rack aisle, wherein the first loading good lifting device is supported on the mounting beams by the mounting section.

29. The rack storage system according to claim 28, the second storage rack further having mounting beams affixed to the front uprights in addition to the front longitudinal beams and extending parallel to the front longitudinal beams, the second vertical mast having a mounting section facing the rack aisle, wherein the second loading good lifting device is supported on the mounting beams by the mounting section.

30. The rack storage system according to claim 29, further comprising walkways arranged in the rack aisle on maintenance levels located on top of one another and affixed to the mounting beams of the first storage rack and to the mounting beams of the second storage rack.

31. The rack storage system according to claim 27, wherein the loading good manipulation unit comprises an energy-absorbing deformation means which is fixedly mounted below the at least one of the first lifting frame and the second lifting frame.

32. The rack storage system according to claim 27, the traction means drive of the at least one of the first lifting drive and the second lifting drive comprising a traction means, and the at least one of the first loading good lifting device and the second loading good lifting device having a tensioning mechanism for assembling the traction means and/or for setting a pretension force in the traction means,
wherein the tensioning mechanism is arranged on the side of the at least one of the first vertical mast and the second vertical mast facing the rack aisle.

33. The rack storage system according to claim 27, wherein
the traction means drive of the at least one of the first lifting drive, the first additional lifting drive, the second lifting drive, and the second additional lifting drive each comprises a drive wheel, a bottom deflection wheel, a top deflection wheel, a guide wheel, and a traction means guided around the drive wheel, the bottom deflection wheel, the top deflection wheel, and the guide wheel,
the bottom deflection wheel being arranged in the region of a base of the at least one of the first vertical mast and the second vertical mast and the top deflection wheel is arranged in the region of a head of the at least one of the first vertical mast and the second vertical mast,
the guide wheel being arranged in the region of the base of the at least one of the first vertical mast and the second vertical mast between the bottom deflection wheel and the drive wheel,
the drive wheel being arranged at a distance to the at least one of the first vertical mast and the second vertical mast in the region of the base of the at least one of the first vertical mast and the second vertical mast, and
a center-to-center distance between the drive wheel and the bottom deflection wheel is at least 300 mm.

34. The rack storage system according to claim 26,
the drive station of the first lifting drive being arranged on a side of the first vertical mast facing the rack aisle and having a drive motor arranged within the rack aisle,
the additional drive station of the first additional lifting drive being arranged on a side of the first vertical mast facing the rack aisle and having an additional drive motor arranged within the rack aisle.

35. The rack storage system according to claim 34,
the drive station of the second lifting drive being arranged on a side of the second vertical mast facing the rack aisle and having a drive motor arranged within the rack aisle,
the additional drive station of the second additional lifting drive being arranged on a side of the second vertical mast facing the rack aisle and having an additional drive motor arranged within the rack aisle.

36. A rack storage system, comprising
a first storage rack and a second storage rack facing each other at a distance in a horizontal z direction,
a rack aisle between the first storage rack and the second storage rack having a longitudinal axis extending horizontally in an x direction aligned orthogonally to the z direction,
the first storage rack having
storage locations for loading goods which are arranged next to one another on storage levels located on top of one another,
front uprights, rear uprights, front longitudinal beams per storage level extending in the x direction and connected to the front uprights, rear longitudinal beams per storage level extending in the x direction and connected to the rear uprights, and a shelf having the storage locations per storage level which is arranged between the front longitudinal beam and the rear longitudinal beam, and
mounting beams affixed to the front rack uprights in addition to the front longitudinal beams and extending parallel to the front longitudinal beams,
the second storage rack having
storage locations for loading goods which are arranged next to one another on storage levels located on top of one another,
front uprights, rear uprights, front longitudinal beams per storage level extending in the x direction and connected to the front uprights, rear longitudinal beams per storage level extending in the x direction and connected to the rear uprights, and a shelf having the storage locations per storage level which is arranged between the front longitudinal beam and the rear longitudinal beam, and
mounting beams affixed to the front uprights in addition to the front longitudinal beams and extending parallel to the front longitudinal beams,
walkways arranged in the rack aisle on maintenance levels located on top of one another and affixed to the mounting beams of the first storage rack and to the mounting beams of the second storage rack,
a loading good manipulation unit having a first buffer device offset laterally to the rack aisle in the z direction, and a first loading good lifting device for storing and/or retrieving loading goods,
the first buffer device having provisioning devices on at least some of the storage levels, wherein the provisioning devices are respectively configured for buffering a loading good or multiple loading goods and are arranged adjacent in the x direction on one of the sides of the first loading good lifting device, or adjacent in the x direction at both sides of the first loading good lifting device, and
the first loading good lifting device for storing and/or retrieving loading goods having
a first vertical mast installed in a stationary manner,
a first lifting drive with a drive station and a traction means drive,
a first additional lifting drive with an additional drive station and an additional traction means drive,
a first lifting frame supported on the first vertical mast and vertically movable using the first lifting drive, the first lifting frame being connected to the traction means drive of the first lifting drive,
a first additional lifting frame supported on the first vertical mast and vertically movable using the first additional lifting drive, the first additional lifting frame being connected to the additional traction means drive of the first additional lifting drive,
a first transport device arranged on the first lifting frame, the first transport device being configured at least for transporting the loading goods between one of the provisioning devices and the first transport device in the x direction,
a first additional transport device arranged on the first additional lifting frame, the first additional transport device being configured at least for transporting the loading goods between one of the provisioning devices and the first additional transport device in the x direction,
guide tracks arranged respectively in pairs on the front longitudinal beams of the first storage rack and on the front longitudinal beams of the second storage rack in horizontal travel planes located on top of one another and extending in an x direction along the first storage rack, the second storage rack and the provisioning devices, at least one automated storage and retrieval unit having at least one load handling device for transporting the loading goods between the storage locations and the provisioning devices, the at least one automated storage and retrieval unit being displaceable in the x direction along the guide tracks on a travel plane in front of the storage locations and in front of the provisioning device, and a first conveying system for transporting loading goods to the first loading good lifting device and/or for transporting loading goods from the first loading good lifting device, the first conveying device being adjoined to the loading good manipulation unit, wherein the first loading good lifting device connects the first conveying system and the provisioning devices in terms of conveying.

37. A rack storage system, comprising a first storage rack and a second storage rack facing each other at a distance in a horizontal z direction, a rack aisle between the first storage rack and the second storage rack having a longitudinal axis extending horizontally in an x direction aligned orthogonally to the z direction, the first storage rack having storage locations for loading goods which are arranged next to one another on storage levels located on top of one another, front uprights, rear uprights, front longitudinal beams per storage level extending in the x direction and connected to the front uprights, rear longitudinal beams per storage level extending in the x direction and connected to the rear uprights, and a shelf having the storage locations per storage level which is arranged between the front longitudinal beam and the rear longitudinal beam, the second storage rack having storage locations for loading goods which are arranged next to one another on storage levels located on top of one another, front uprights, rear uprights, front longitudinal beams per storage level extending in the x direction and connected to the front uprights, rear longitudinal beams per storage level extending in the x direction and connected to the rear uprights, and a shelf having the storage locations per storage level which is arranged between the front longitudinal beam and the rear longitudinal beam, a loading good manipulation unit having a first buffer device offset laterally to the rack aisle in the z direction, and a first loading good lifting device for storing and/or retrieving loading goods, the first buffer device having provisioning devices on at least some of the storage levels, wherein the provisioning devices are respectively configured for buffering a loading good or multiple loading goods and are arranged adjacent in the x direction on one of the sides of the first loading good lifting device, or adjacent in the x direction at both sides of the first loading good lifting device, and the first loading good lifting device for storing and/or retrieving loading goods having a first vertical mast installed in a stationary manner, a first lifting drive with a drive station and a traction means drive, a first additional lifting drive with an additional drive station and an additional traction means drive, wherein the traction means drive and additional traction means drive each comprises a drive wheel, a bottom deflection wheel, a top deflection wheel, a guide wheel, and a traction means guided around the drive wheel, the bottom deflection wheel, the top deflection wheel, and the guide wheel, and wherein the bottom deflection wheel is arranged in the region of a base of the first vertical mast and the top deflection wheel is arranged in the region of a head of the first vertical mast, and wherein the guide wheel is arranged in the region of the base of the first vertical mast between the bottom deflection wheel and the drive wheel, and wherein the drive wheel is arranged at a distance to the first vertical mast in the region of the base of the first vertical mast, and wherein a center-to-center distance between the drive wheel and the bottom deflection wheel is at least 300 mm, a first lifting frame supported on the first vertical mast and vertically movable using the first lifting drive, the first lifting frame being connected to the traction means drive of the first lifting drive, a first additional lifting frame supported on the first vertical mast and vertically movable using the first additional lifting drive, the first additional lifting frame being connected to the additional traction means drive of the first additional lifting drive, a first transport device arranged on the first lifting frame, the first transport device being configured at least for transporting the loading goods between one of the provisioning devices and the first transport device in the x direction, a first additional transport device arranged on the first additional lifting frame, the first additional transport device being configured at least for transporting the loading goods between one of the provisioning devices and the first additional transport device in the x direction, guide tracks arranged respectively in pairs on the front longitudinal beams of the first storage rack and on the front longitudinal beams of the second storage rack in horizontal travel planes located on top of one another and extending in an x direction along the first storage rack, the second storage rack and the provisioning devices, at least one automated storage and retrieval unit having at least one load handling device for transporting the loading goods between the storage locations and the provisioning devices, the at least one automated storage and retrieval unit being displaceable in the x direction along the guide tracks on a travel plane in front of the storage locations and in front of the provisioning device, and a first conveying system for transporting loading goods to the first loading good lifting device and/or for transporting loading goods from the first loading good lifting device, the first conveying device being adjoined to the loading good manipulation unit, wherein the first loading good lifting device connects the first conveying system and the provisioning devices in terms of conveying.

* * * * *

UNITED STATES PATENT AND TRADEMARK OFFICE
CERTIFICATE OF CORRECTION

| | |
|---|---|
| PATENT NO. | : 12,134,520 B2 |
| APPLICATION NO. | : 17/299658 |
| DATED | : November 5, 2024 |
| INVENTOR(S) | : Johannes Schauer et al. |

It is certified that error appears in the above-identified patent and that said Letters Patent is hereby corrected as shown below:

In the Claims

In Column 31, Line 20 (Line 38 of Claim 1): delete "which"

In Column 31, Line 52 (Line 71 of Claim 1): delete "which"

In Column 34, Line 47 (Line 2 of Claim 17): delete "wherein"

In Column 34, Line 58 (Line 13 of Claim 17): delete "comprises"

In Column 35, Line 42 (Line 5 of Claim 23): delete "has"

In Column 35, Line 50 (Line 1 of Claim 24): delete "wherein"

In Column 35, Line 66 (Line 10 of Claim 25): delete "is"

In Column 36, Line 9 (Line 20 of Claim 25): delete "is"

Signed and Sealed this
Third Day of December, 2024

Katherine Kelly Vidal
*Director of the United States Patent and Trademark Office*